United States Patent [19]
Watanabe et al.

[11] Patent Number: 5,019,840
[45] Date of Patent: May 28, 1991

[54] RECORDING APPARATUS WITH IMPROVED SHEET FEEDING

[75] Inventors: Yoshitaka Watanabe, Tokyo; Toshiharu Mamiya, Kawasaki; Tadashi Ishikawa, Urawa; Takashi Endo, Machida; Jiro Moriyama, Yokohama, all of Japan

[73] Assignee: Canon Kabushiki Kaisha, Tokyo, Japan

[21] Appl. No.: 522,455

[22] Filed: May 14, 1990

Related U.S. Application Data

[63] Continuation of Ser. No. 217,052, Jul. 11, 1988, abandoned, which is a continuation of Ser. No. 62,414, Jun. 16, 1987, abandoned, which is a continuation of Ser. No. 715,965, Mar. 25, 1985, abandoned.

[30] Foreign Application Priority Data

| Mar. 30, 1984 | [JP] | Japan | 59-64953 |
| Mar. 30, 1984 | [JP] | Japan | 59-64954 |
| Mar. 30, 1984 | [JP] | Japan | 59-64956 |
| Mar. 30, 1984 | [JP] | Japan | 59-64957 |

[51] Int. Cl.$^5$ .............................. H04N 1/21
[52] U.S. Cl. .................... 346/134; 346/136; 355/308; 355/309; 271/4; 271/18
[58] Field of Search ............... 346/134, 136; 271/4, 271/10, 18, 100, 114; 355/308, 309

[56] References Cited

U.S. PATENT DOCUMENTS

| 3,519,117 | 7/1970 | Smith . | |
| 4,025,178 | 5/1977 | Yokozawa | 355/14 SH |
| 4,237,466 | 12/1980 | Scranton | 346/13 H |
| 4,262,894 | 4/1981 | Marano | 271/4 |
| 4,268,021 | 5/1981 | Rutishauser et al. | 271/4 |
| 4,326,815 | 4/1982 | Kapp . | |
| 4,354,759 | 10/1982 | Bujese | 271/18 |
| 4,541,711 | 9/1985 | Takahashi | 355/14 SH |
| 4,647,239 | 3/1987 | Maezawa et al. . | |
| 4,671,683 | 6/1987 | Ueno et al. . | |

FOREIGN PATENT DOCUMENTS

| 59-225976 | 12/1984 | Japan . |
| 60-40271 | 3/1985 | Japan . |
| 60-67182 | 4/1985 | Japan . |

*Primary Examiner*—Mark J. Reinhart
*Attorney, Agent, or Firm*—Fitzpatrick, Cella, Harper & Scinto

[57] ABSTRACT

A recording apparatus includes: a recording unit for performing a recording onto a recording paper; a paper feeder roller for feeding the recording paper to a recording position of the recording unit; a conveyor for conveying the recording paper in association with the recording by the recording unit; a drive source for driving the conveyor; and a control unit for moving the paper feeder roller from an operation position to a retreat position using the drive power of the drive source.

36 Claims, 22 Drawing Sheets

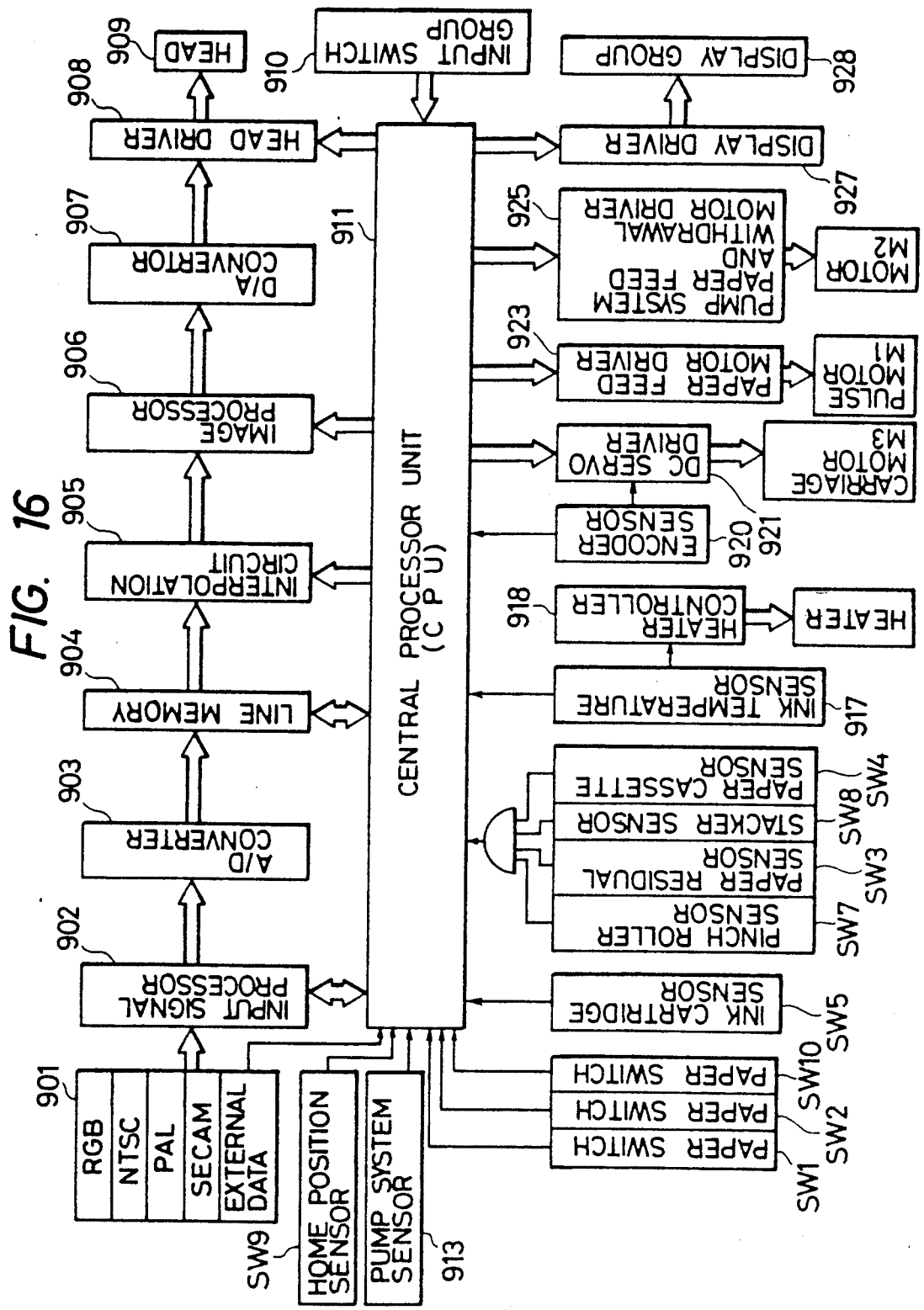

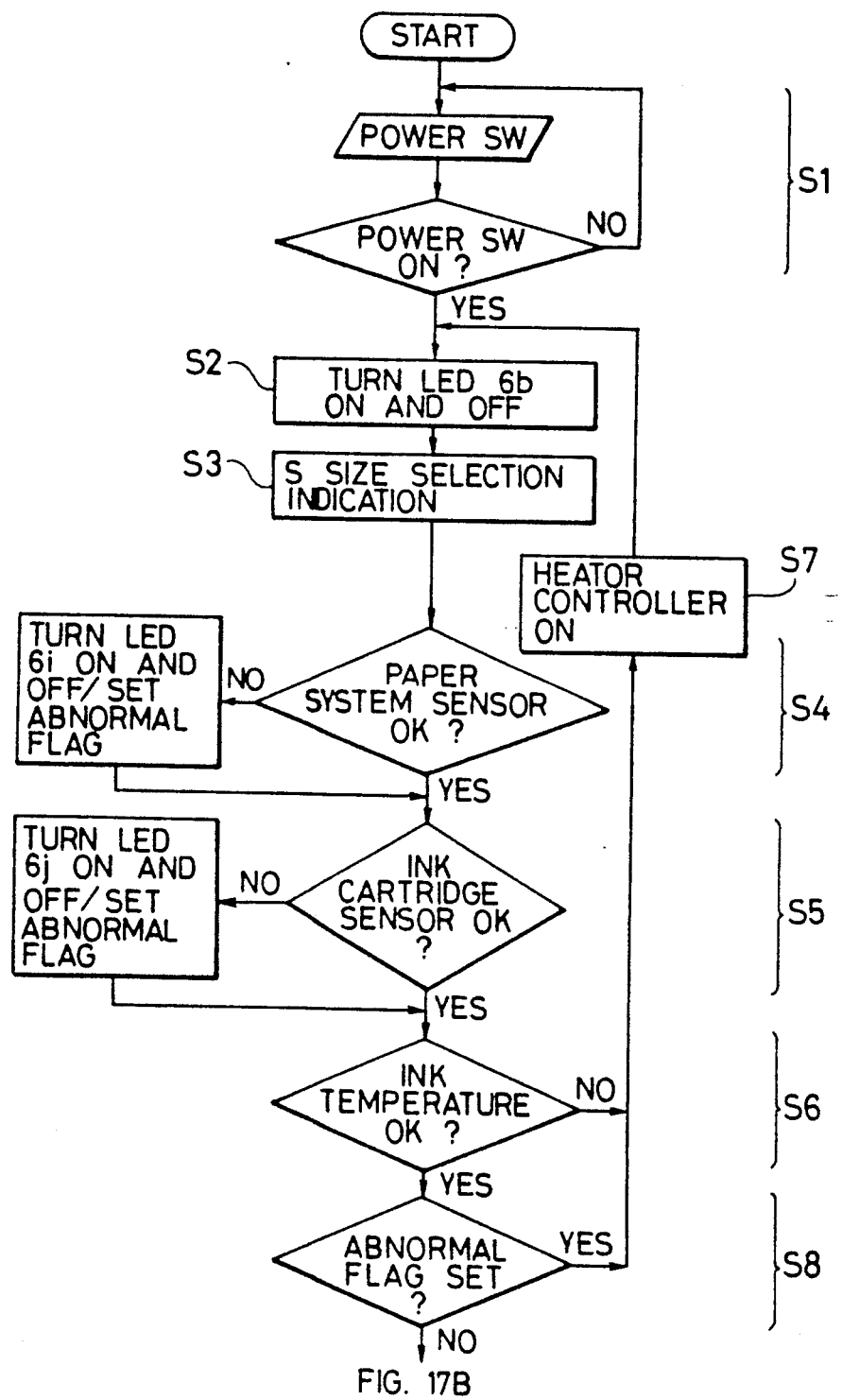

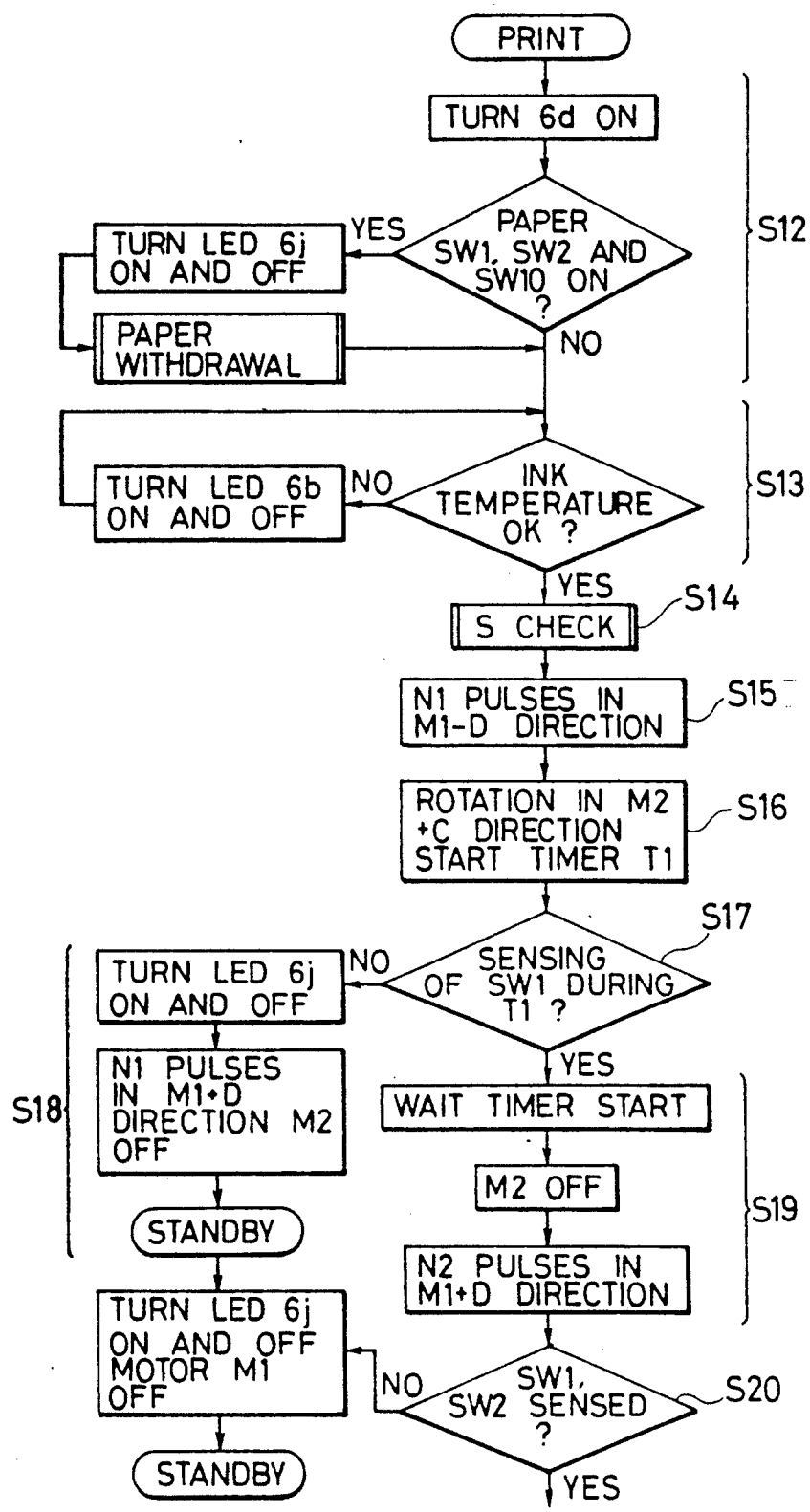

RECORDING APPARATUS WITH IMPROVED SHEET FEEDING

This application is a continuation of application Ser. No. 217,052 filed July 11, 1988 now abandoned, which is a continuation of U.S. application Ser. No. 062,414, filed June 16, 1987, now abandoned, which in turn is a continuation of U.S. patent application Ser. No. 715,965 filed Mar. 25, 1985, now abandoned.

BACKGROUND OF THE INVENTION

1. Field of the Invention

The present invention relates to a recording apparatus for recording characters and images on a recording paper, and more particularly, it relates to a feeder system of a recording apparatus.

2. Description of the Prior Art

Automatic operation for a paper feeder system in a recording apparatus such as a printer or a copier has been introduced before. Previously, the following series of operations are carried out automatically: a recording paper is pulled out sheet by sheet from a paper cassette; the pulled out paper is guided to a recording position; and after completion of recording the printed recording paper is withdrawn onto a paper withdrawal tray. It is necessary to provide paper feeder and withdrawal rollers, and a drive source for driving the rollers into rotation so as to attain such automatic operations. In this case, if the paper feeder and withdrawal rollers are driven into rotation during the operation of the recording unit, or if the rollers are in contact with the recording paper, the printing quality of the images, characters and the like formed by recording unit onto the recording paper is degraded. Therefore, in order to avoid such problems, it is necessary to set the paper feeder and withdrawal rollers apart from the recording paper during the recording operation, which results in a necessity for a drive source for removing the rollers from the recording paper.

As above, if such automatic paper feeder operations are considered, the apparatus may easily become complicated and bulky, and problems in the reliability of the apparatus may readily arise.

SUMMARY OF THE INVENTION

In view of the above problems, it is a primary object of the present invention to provide a recording apparatus provided with a paper feeder mechanism which is simple in construction and which has little influence upon the printing quality.

According to one aspect of the present invention in view of the first object, a recording apparatus for recording onto a recording paper comprises: recording means for recording onto said recording paper; a paper feeder roller for feeding said recording paper to a recording position for said recording means; conveyor means for conveying said recording paper in association with said recording by said recording means; a drive source for driving said conveyor means; and control means for moving said paper feeder roller from an operation position to a retreat position using the drive power of said drive source.

According to the above aspect, it is possible to ensure the feeder precision of a recording paper and in addition it is possible to reduce the number of drive sources, which contributes to the improved reliability of the apparatus, simplification of the mechanism, and miniaturization of the apparatus.

According to another aspect of the present invention, a recording apparatus for recording onto a recording paper comprises: recording means for recording onto the recording paper; a paper withdrawal roller for withdrawing said recording paper from a recording position for said recording means; conveyor means for conveying said recording paper in association with said recording by said recording means; a drive source for driving said conveyor means; and control means for moving said paper withdrawal roller from an operation position to a retreat position using the drive power of said drive source.

According to the above aspect, it is possible to ensure the feeding precision of a recording paper during the recording operation and to avoid occurrences of jamming, and to reduce the number of drive sources, which contributes to the improvement in reliability of the apparatus, simplification of the mechanism, and miniaturization of the apparatus.

It is the above and other objects of the present invention to provide a recording apparatus provided with a recording paper feeder system contributable to a further miniaturization of the apparatus.

According to another aspect of the present invention in view of the above objects, a recording apparatus for recording onto a recording paper comprises: recording means for recording onto said recording paper having a predetermined length in the feeder direction; a paper withdrawal roller for withdrawing said recording paper from said recording position for said recording means; conveyor means for conveying said recording paper in association with said recording by said recording means; a withdrawal conveyance passage along which said recording paper is conveyed from said recording position to the operation position of said withdrawal roller, said withdrawal conveyance passage being shorter than said predetermined length; and control means for retreating said paper withdrawal roller from said operation position during said recording.

The above aspect precludes that the printing quality is adversely effected under the pushing force of a paper withdrawal roller against the recording paper during the recording operation. Therefore, it is possible to ensure the precision of the conveyance means during the recording operation and also to shorten the withdrawal conveyance passage, which contributes to the miniaturization of the apparatus. The contribution to the improvement in the printing quality is particularly effective for recording apparatuses printing characters and images, such as ink jet printers or thermal printers.

Furthermore, in the case that paper cloggings and the like happen during the recording operation, it is advantageous in view of operational performance in that the jammed recording paper can be easily removed at the side of the paper withdrawal roller.

It is still another object of the present invention to provide a recording apparatus aiming at the reduction in cost, improvement in reliability, and miniaturization in which both paper feeder and withdrawal rollers are driven with the same drive source and the withdrawal of the recording paper can be effected without feeding additional recording papers.

According to a further aspect of the present invention under the above object, a recording apparatus for recording onto a recording paper comprises: recording means for recording onto said recording paper; a paper feeder roller for feeding said recording paper to a recording position for said recording means; a paper withdrawal roller for withdrawing said recording paper from said recording position; a drive source for rotating said both rollers; first transmission means for transmitting the drive power of said drive source to said paper feeder roller through a one way transmission mechanism; second transmission means for transmitting the drive power of said drive source to said paper withdrawal roller; and change-over means for reversing the rotation direction of said drive source during the paper feeding and withdrawing.

According to the above aspect, since a single drive source is sufficient for the paper feeder and withdrawal rollers, it is possible to achieve a reduction in cost, improvement in reliability, and miniaturization of the apparatus. In addition, since the feeding of unnecessary recording papers i.e., the inadvertently performed paper feeding can be avoided, operational performance for the user can be improved.

The various aspects of the present invention as described above may of course be combined as desired.

Many other objects, aspects, and features of the present invention will become apparent from the following detailed description with reference to the accompanying drawings of the embodiments.

The term recording paper here used in the specification is not merely limited to paper, but it includes in general, a sheet member capable of being recorded on the surface thereof, such as a sheet made of synthetic resin. Further, in the following description, as an example of recording apparatuses, an ink jet printer has been incorporated. However, it is apparent that other recording apparatuses may apply, such as thermal printers and electrophotographic (xerography) printers. The present invention is particularly suitable for the application to such recording apparatuses forming characters and images with dots.

BRIEF DESCRIPTION OF THE DRAWINGS

A preferred embodiment realizing the various aspects of the present invention will be described with reference to the accompanying drawings, wherein

FIG. 16 is a block diagram showing a control circuit system of the apparatus, and FIGS. 17a, 17b, 18 to 21, 22a-l, 22a-z, 22b, 22c-l and 22c-z are operation flow charts in accordance with a program stored in a central processor unit.

DETAILED DESCRIPTION OF THE PREFERRED EMBODIMENT

General Outline of Printer

Figure 1:
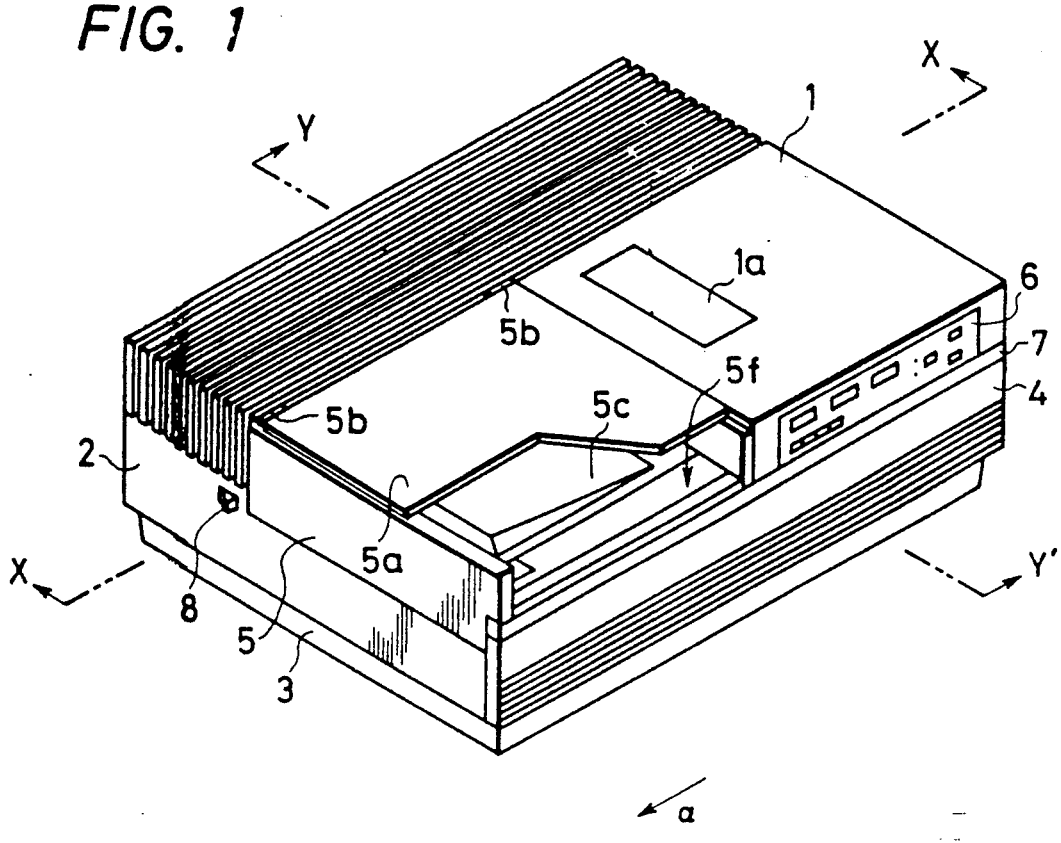
FIG. 1 is a front perspective view of the ink jet recording apparatus according to the embodiment of the present invention.

Referring now to FIGS. 1 to 4 numeral 1 represents an upper cover, numeral 2 represents a lower cover, numeral 3 represents a bottom cover, numeral 4 represents a front cover, and numeral 5 represents a stacker into which printed recording papers are automatically withdrawn and accommodated. Numeral 6 represents an operation panel for the printer, and numeral 7 represents a stay cover which functions both as a mechanical reinforcement and ornamental accent stripe.

On the upper cover 1, an upper plate 1a made of transparent material (such as acrylic resin) is fixedly attached so that the inner part of the printer can be seen through the plate 1. The plate 1 is provided so as to monitor the printing quality of a recording paper prior to its withdrawal; for example, to monitor the coloring conditions in printing. Thus, it is possible to effect if necessary an earlier adjustment or the like.

Figure 2:
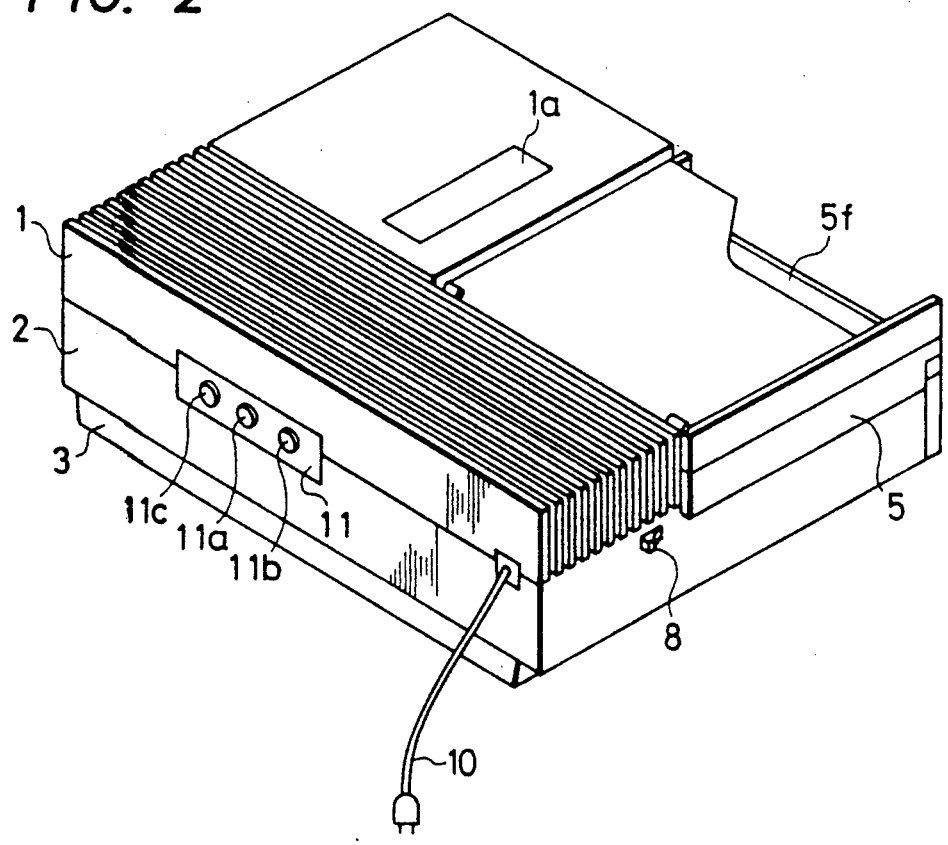
FIG. 2 is a rear perspective view of the apparatus of FIG. 1.

In FIG. 2, numeral 10 represents a power source cord, and numeral 11 represents an input source panel. In the input source panel 11 of the present embodiment, provided are a connector 11a for use in inputting NTSC signals, connector 11b for use in inputting R.G.B. color signals, and connector 11c for use in inputting such as character and image data from peripheral devices such as personnel computers.

Figure 3:
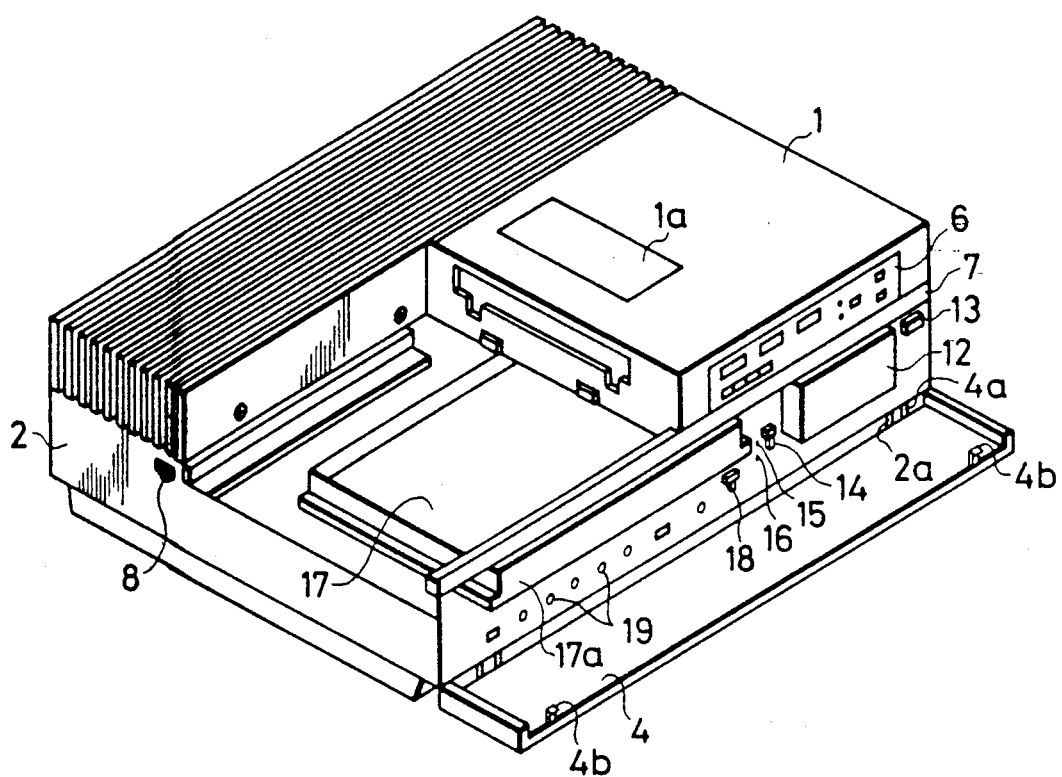
FIG. 3 is a perspective view of the apparatus of FIG. 1, wherein a front cover and stacker are dismounted from the apparatus.
Figure 6:
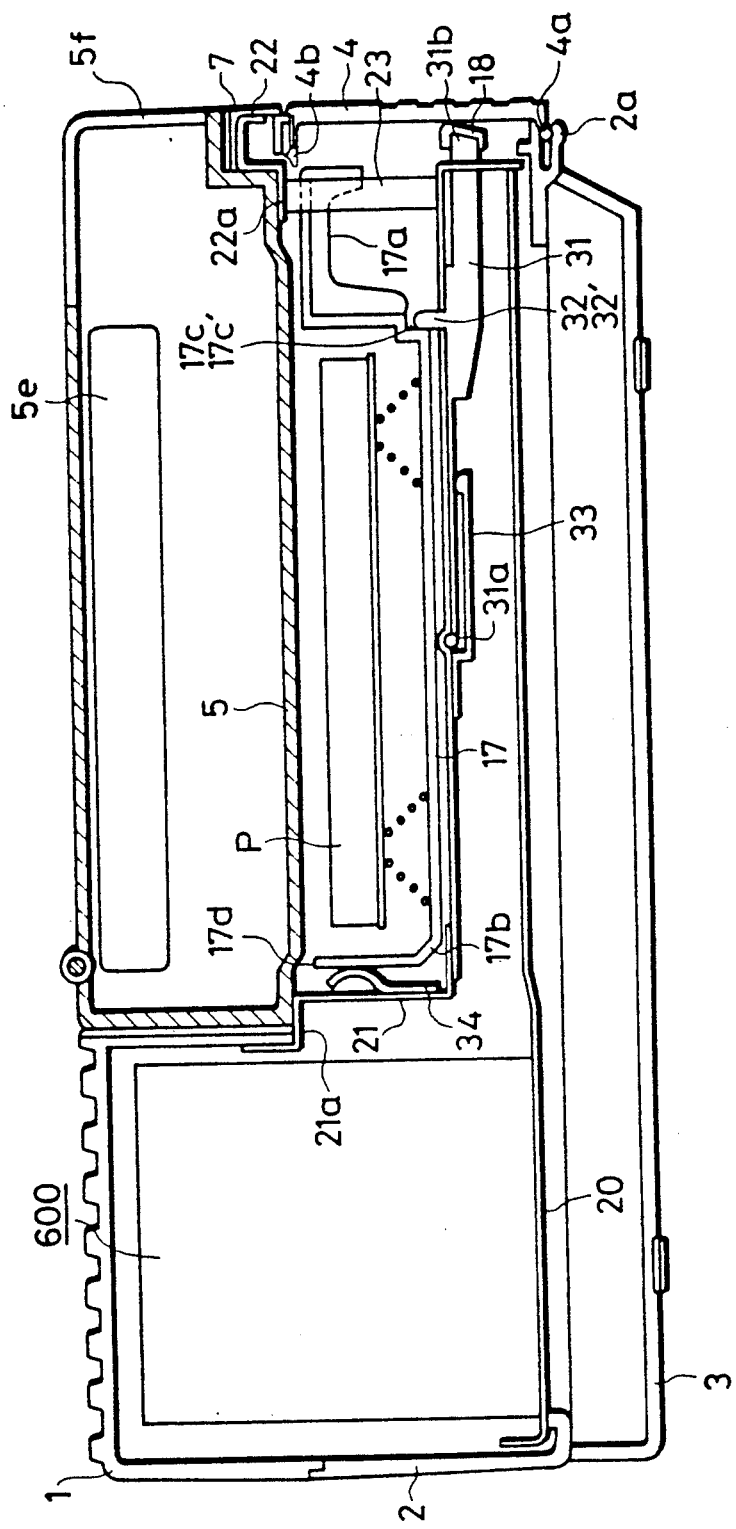
FIG. 6 is a cross sectional view cut along a line Y—Y' of FIG. 1.

As particularly shown in FIGS. 3 and 6, supporting shafts 4a of the front cover 4 are coupled to pivot sections 2a of the lower cover 2. The front cover 4 is mounted rotatable about the supporting shafts 4a and arranged such that hooks 4b engage with the stay cover 7.

The front cover 4 is automatically removed from the pivot sections 2a if the former is further rotated downward.

Figure 4:
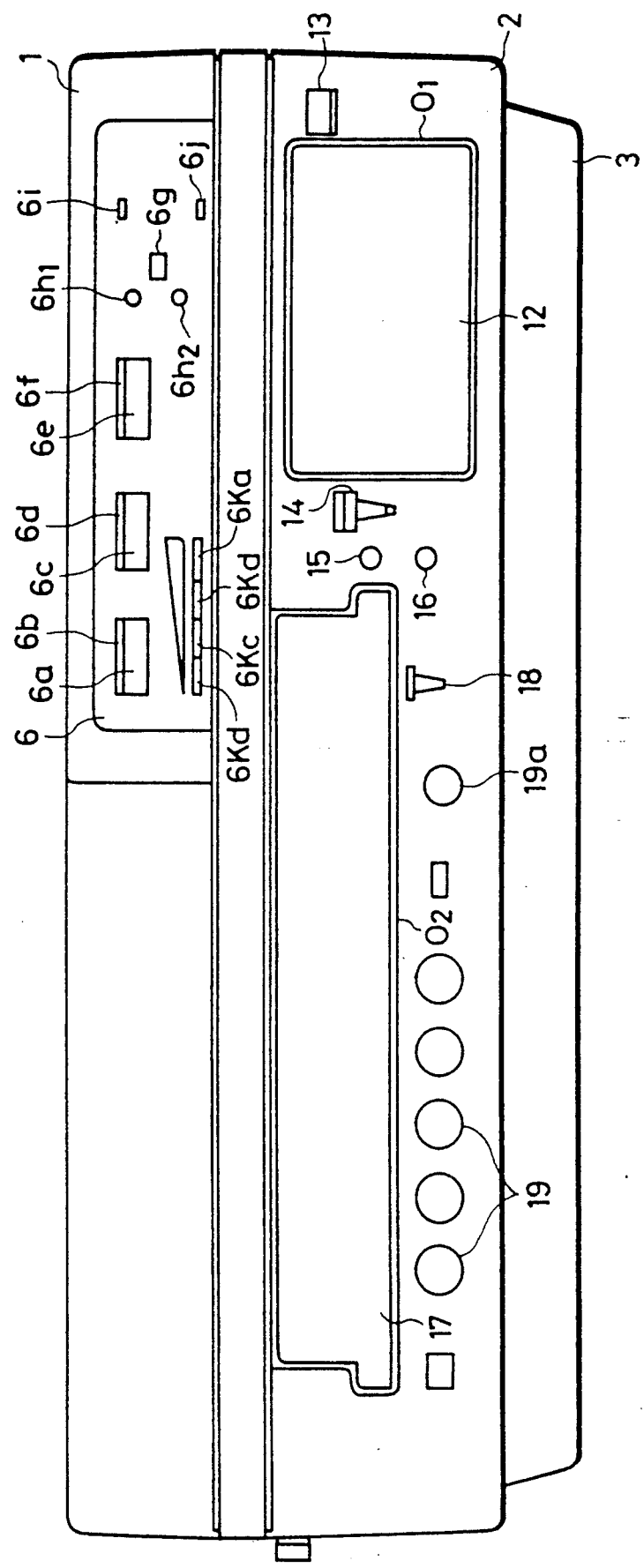
FIG. 4 is a view of the apparatus in the dismounted state of FIG. 3, as seen from the front or operation side.

In FIGS. 3 and 4, numeral 12 represents an ink cartridge, and numeral 13 represents a release knob for the ink cartridge. The ink cartridge 12 is inserted into the apparatus through an ink cartridge insertion opening 01 (FIG. 4) by directing the ink supply side of the cartridge to the inside of the apparatus. If the release knob 13 is swung downward as the ink in the cartridge 12 becomes empty, by virtue of the structure described later, the ink cartridge 12 is pushed forward a little. Therefore, the following pulling operation by the user makes it possible to remove the cartridge from the apparatus.

Numeral 14 represents a roller release knob for releasing a resist roller 103, best seen in FIG. 5, and pinch roller 104 described later from a platen 101. By sliding the roller release knob 14 downward, the resist and pinch rollers 103 and 104 are released from the platen 101. This release is effective against some troubles such as paper clogging, and is aimed at preventing tearing of papers within the printer while correcting a jam disposal. In particular, since the rollers 103 and 104 are released from the platen, the jammed paper can be readily pulled out.

Numeral 15 represents a reset button for restoring the resist roller 103 and pinch roller 104 into tight contact with the platen 101, the reset being enabled in this embodiment by pushing the reset button 15.

Numeral 16 represents a reset button for a residual ink amount counter. As the amount of ink within the ink cartridge 12 becomes insufficient for retaining a good printing, a display of "ink empty" is presented on a residual ink amount displaying LED 6K described later. In such a case, therefore, the user must mount a new ink cartridge 12 in place of the consumed ink cartridge 12 which is pulled out after swinging downward the ink cartridge release knob 13. At this time, as the reset button 16 for the residual ink amount counter is depressed, the counter which will be described later is reset.

Numeral 17 represents a paper feeder cassette. In the present embodiment, about 100 paper sheets can be set within the cassette 17. The cassette 17 can be inserted and mounted within the apparatus through an opening 02 (FIG. 4) with a pull 17a directing to the user side. Numeral 18 represents a paper cassette release knob. By swinging the knob 18 from the upper position to the lower position, the paper cassette 17 is slightly pushed to the user side. Thus, by pulling out the paper cassette 17 with the pull 17a grasped, the cassette 17 can be removed from the printer.

Numeral 19 represents operation members such as switches and adjustment knobs for use in such as switching over inputs and adjusting the printing quality.

Operation Panel

Next, the operation panel 6 will be described with reference to FIG. 4.

Reference 6a represents a power switch, reference 6b represents a light emission diode (referred to as LED hereinafter) for displaying the on/off state of the power switch, reference 6c represents a print start switch, reference 6d represents an LED for displaying the preprinting state, reference 6e represents a stop switch, reference 6f represents an LED for displaying the printing stop state, and reference 6g represents a switch for changing the print size which in the present embodiment can select either one of the two sizes, i.e., a larger one (L) and a smaller one (S). References 6h1 and 6h2 represent LEDs for displaying the print size, the former being indicative of the selection of the larger size (L) and the latter indicative of the smaller size (S). Reference 6i represents an LED for displaying various problems, such as jammed papers and paper empty. Reference 6j represents an LED for displaying the dismount state of the ink cartridge 12. Reference 6k represents LEDs for displaying the amount of residual ink. In displaying the residual ink amount, although four LEDs 6Ka to 6Kd are used in the present embodiment, the number of LEDs may be as desired.

As seen from the above description of the embodiment, the mounting sections for the ink cartridge 12 and paper cassette 17, a withdrawal section (stacker 5) for printed papers, and the operation section or panel including a print start switch and the like, are all disposed at the front face of the apparatus. Therefore, the operations for the apparatus can be managed through only one side of the apparatus, resulting in operational ease. Furthermore, it is possible to place other apparatuses adjacent both sides or on the upper side of the apparatus.

Outline of Printer

Figure 5:
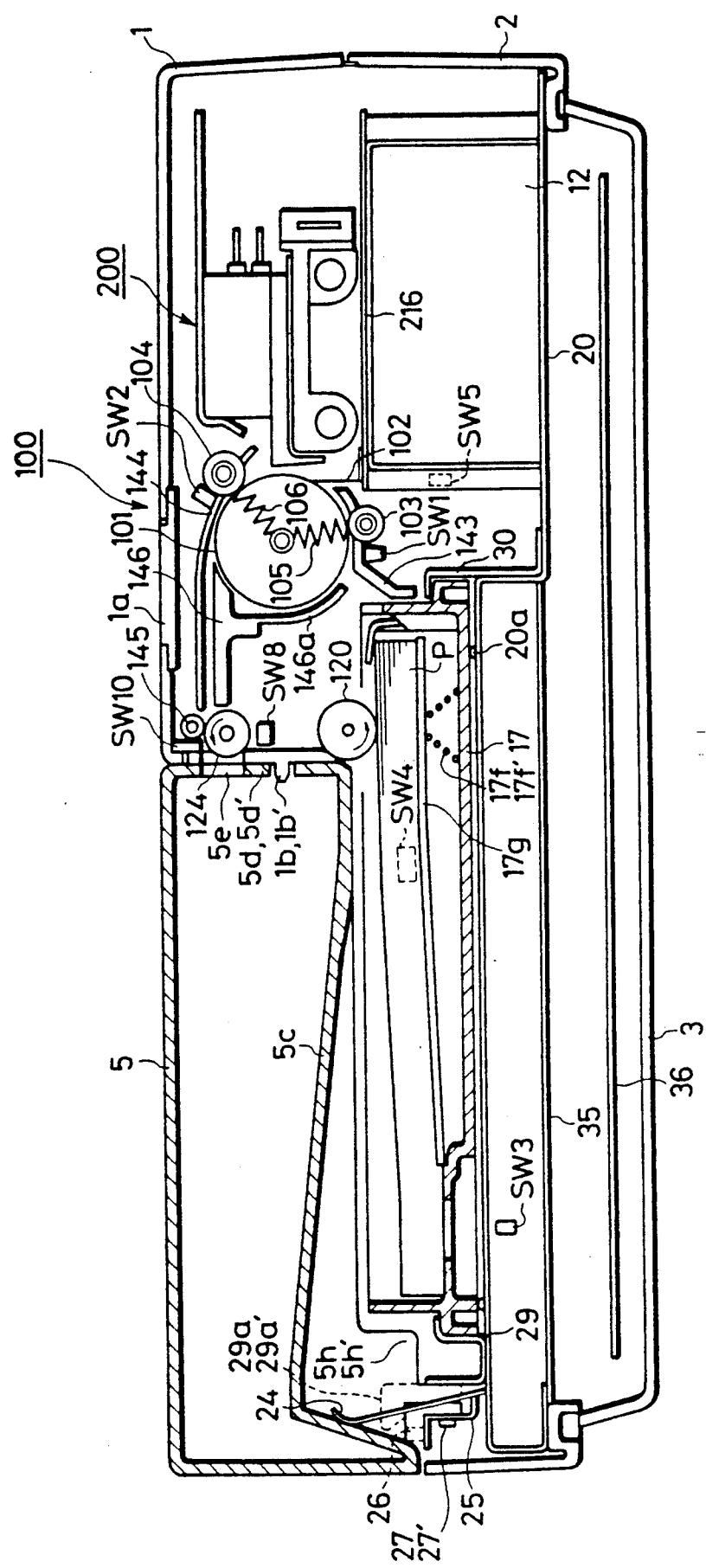
FIG. 5 is a cross sectional view cut along a line X—X' of FIG. 1.

In FIGS. 5 and 6, numeral 20 represents a main frame used as a base for the printer. Numeral 100 represents a paper feeder and withdrawal system associated mainly with the platen 101, and numeral 200 represents a head and ink supplying system. Both systems are supported on the main frame 20 and the description thereof will be given later. Numeral 21 represents a stacker guide, numeral 22 represents a stay, and numeral 23 represents a stay supporting shaft, wherein the one ends of the stacker guide 21 and stay supporting shaft 23 are fixedly mounted to the main frame 20. The other end of the stay supporting shaft 23 is fixedly connected to the stay 22. The stacker 5 slides upon the stacker guide 21 and rail surfaces 21a and 22a of the stay 22 for movement therealong. Two engaging pins 1b and 1b' are mounted on the upper cover 1, while engaging holes 5d and 5d' are formed in the stacker 5. The position setting for the stacker 5 is determined by the structure formed by the hole 5d and the pin 1b, together with the hole 5d' and the pin 1b', when stacker 5 is mounted, thereby making a paper ejection outlet 5e which is not movable both in the up and down, or right and left directions. Numeral 24 represents a leaf spring, numeral 25 represents a slide lever, numeral 26 represents a stop pin, and numerals 27 and 27' represent guide shafts. The leaf spring 24 serves as a spring for pushing back the stacker 5 in the direction opposite to the pull-out direction thereof. The slide lever 25 is provided with the stop in 26 fixedly mounted thereon and is disposed so as to slidable on the guide shafts 27 and 27'. In releasing stacker 5, a stacker release knob 8 fixedly mounted on the slide lever 25 is simply slid rearward the release of the stacker 5 is effected.

Numerals 29 and 30 represent cassette guides each fixedly mounted on the main frame. A protrusion 20a is locally mounted on the main frame 20, the position setting for the paper cassette 17 in the vertical direction being performed by the protrusion 20a and the cassette guides 29 and 30. In the present embodiment, the perpendicularity of a recording paper relative to the paper feeding direction and the axial direction of the platen roller 101 is ensured by the following structure. In particular, a cassette release lever 31 is provided with a pivot 31a and knob attaching portion 31b and provided with position setting pins 32 and 32' fixedly connected thereto. Numeral 33 represents a lever restoration spring, and numeral 34 represents a cassette restoration spring. Although both springs are made of leaf springs in this embodiment, any other types of springs may be employed. The paper cassette 17 is formed with an inclined plane 17b and position setting step portions 17c and 17c'. By holding the pull 17a and inserting the paper cassette 17 along the cassette guides 29 and 30, the position setting pins 32 and 32' come into contact with the inclined plane 17b of the cassette 17, thereby pushing down the release lever 31. With a further advancement of the paper cassette 17, one end 17d of the cassette 17 is brought in charge of the cassette restoration spring 34 until at last the position setting pins 32 and 327 are engaged with the cassette grooves or step portions 17c and 17c' to thereby set the position for the cassette 17. The release of the cassette 17 can be effected by swinging downward the cassette release knob 18 fixedly connected by tight insertion into the knob attaching portion 31b.

Numerals 35 and 36 represent circuit boards mounted on which are electronic components forming such as sequence controller, image processing circuit system, and television interface. The circuit boards 35 and 36 are disposed under the main frame 20, which circuit boards are accessible for maintenance purposes by removing the bottom cover 3.

Figure 7:
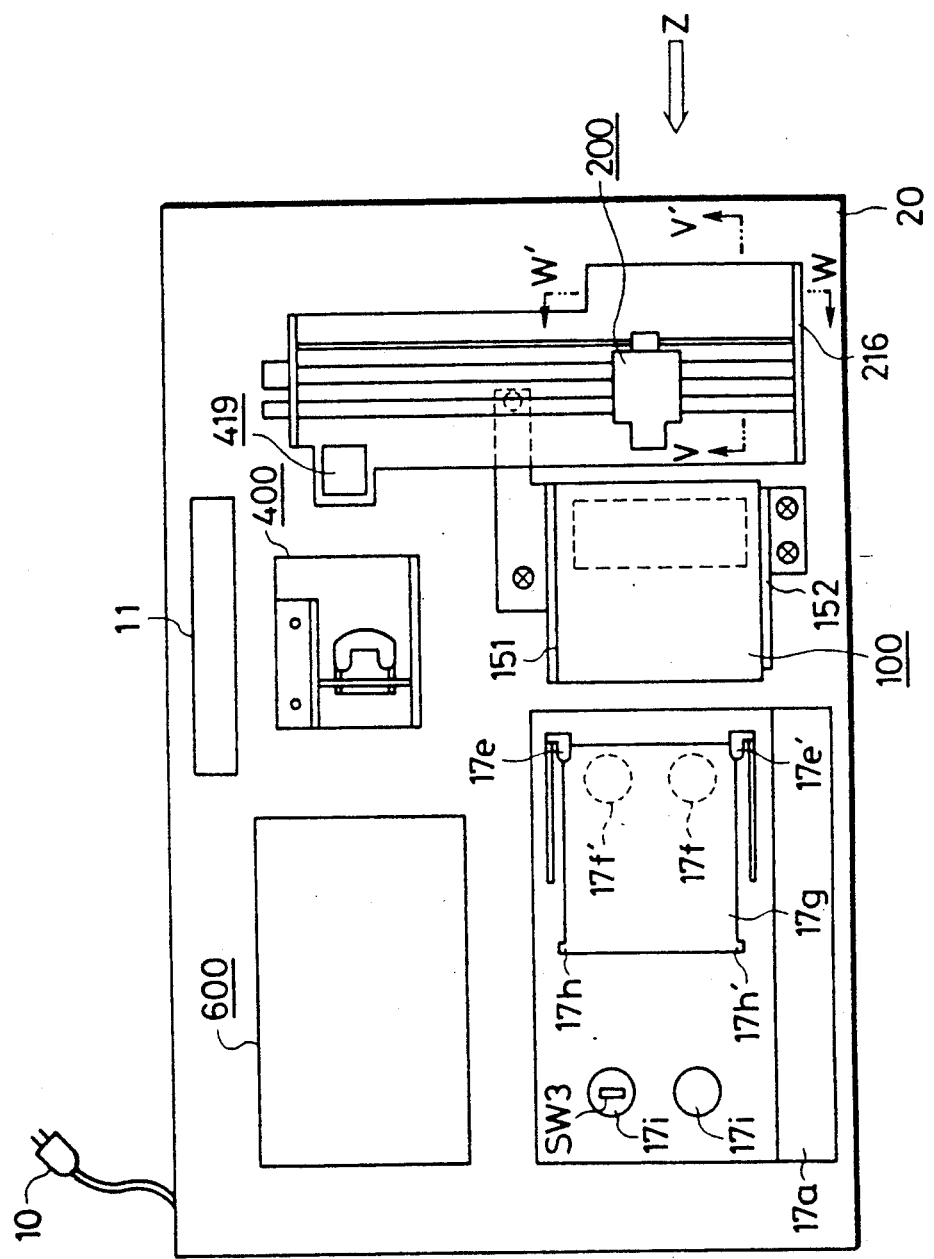
FIG. 7 is a top view of the apparatus of FIG. 1, wherein an upper cover is removed from the apparatus.

In FIG. 7, numeral 400 represents a pump unit of a restoration system for the printer, numeral 419 represents a capping unit for recording heads, and numeral 600 represents a power source unit, all of them being fixedly mounted on the main frame 20.

Stacker

The stacker 5 is detachably mounted on the printer as described previously and is moved to slide in the arrow direction in FIG. 1 by releasing the stacker release knob 8. Upon further dislocation of the stacker 5 in the arrow direction, the stacker itself is completely removed from the printer. Incorporation of the detachable structure for the stacker 5 allows easier removal of jammed papers when they occur. A switch SW8 (FIG. 5) is provided for determining whether the stacker 5 is properly inserted. It is needless to say that if the stacker 5 is taken away, the paper feeder system and recording system can not be driven into operation even if the print start operation button is depressed. The upper portion of the stacker 5 is formed with a transparent upper plate 5a so that the printing operation can be monitored outside of the apparatus from the upper or slanted upper position. The transparent upper plate 5s is provided with a pivot 5b so as to be rotatably mounted on the stacker 5. Printed recording papers within the stacker 5 may be removed either by turning the transparent upper plate 5a or through an opening 5f formed in the front face of the apparatus for such purpose. In other words, in view of the characteristic features of the invention that the operations can be managed through only a single front side of the apparatus, printed recording papers can be removed without turning the transparent upper plate 5a. In addition, part of the transparent upper plate 5a is cut away for easy manual access.

It is noted that in order to pull out recording papers, the bottom portion 5c of the stacker 5 is formed with an inclined plane which gradually goes upward as it moves away from a paper withdrawal roller 124 described later. The reason why the space to the bottom of the stacker 5 is made deeper at the side of the paper withdrawal roller 124 is to aim at accommodating curled printing papers as best as possible.

As seen from the above description, the stacker 5 of the present embodiment comprises the upper plate (5a) at the upper face and a loading plate (at the bottom face 5c) for piling up a recording medium of a sheet form, that is, a recording paper P. The upper face is generally even with the top face of the apparatus body, and the loading plane is inclined such that the space between the loading plane and upper plate becomes shorter in the withdrawal direction of a recording medium. Therefore, other apparatuses can be placed upon the recording apparatus, and the apparatus may even be placed within a limited space. Furthermore, even if a recording medium curled in the direction perpendicular to the ejection direction is ejected, a large number of such recording media can be accommodated within the stacker. In FIG. 5, represented by reference SW10 is a switch for detecting the presence or absence of recording papers at the recording paper ejection outlet.

Paper Feeder Cassette

The paper feeder cassette 17 will be described in detail with reference to FIGS. 5, 6 and 7.

As is similar to those cassettes commonly used with copiers or the like, cut-sheet recording papers P can be set in the cassette 17, by pushing them from the upper side between separation nails 17e and 17e' and intermediate plate 17g against the forces exerted by restoration springs 17f and 17f. The separation nails 17e and 17e' are pivotally mounted about (unillustrated) supporting shafts, the pivotal range being restricted by (unillustrated) stoppers so as to prevent the recording papers P from protruding over the upper face of the cassette. The restoration springs 17f and 17f act to push up the intermediate plate 17g and cut sheet recording papers P. The intermediate plate 17g is pivotally mounted about fulcrums 17h and 17h'. With the help of suitable contact pressures (F) of the restoration springs and the friction coefficient (u) of a paper feeder roller 120 described later, the recording papers P can be stably separated one by one. That is, the separation force between recording papers P is determined by the following inequality:

$$(u - up)F > 0 \tag{1}$$

wherein up represents a friction coefficient between the papers. The restoration springs 17f and 17f preferably used are of a conical shape. By virtue of the conical shape, the height of the spring becomes the diameter of coil wire of the spring when the intermediate plate 17g is depressed to the lowermost position, resulting in proper accommodation of the recording papers P. In other words, it is very much advantageous that a number of recording papers P can be accommodated and the overall height of the printer can be lowered. It is desirable however in this case to design a way that the contact pressure (F) against the paper feeder roller 120 should be kept constant over the various heights of the piled-up cut sheet papers P.

Generally, if a conical coil spring is wound at a constant pitch, the relation between load and displacement of the spring is not in proportion to each other. Therefore, in the present embodiment, the conical compression spring is wound at an unequal pitch so that the contact pressure (F) against the paper feeder roller 120 is maintained substantially constant over the various heights of the piled-up cut sheet papers P. In particular, the pitch is made small where the diameters of windings of the coil spring are small, and the larger the winding diameter becomes, the pitch is made broader.

The conical coil springs 17f and 17f as such are used as restoration springs. Therefore, the heights of the conical coil springs 17f and 17f, when the intermediate plate 17g is depressed to the lowermost position and the coil springs are compressed, become equal to the diameter of coil wire of the springs. Consequently, it is possible to increase the number of sheet recording papers P to be accommodated within the cassette, and at the same time miniaturize the paper feeder cassette. Reference 17i represents an aperture formed in the bottom of the paper cassette. Although two apertures are formed in the embodiment, one or more than two apertures are also possible. Since the printer of the present invention is made compact as a whole, the paper cassette 17 itself is also made small. That is, excepting pull 17a, the whole dimension is slightly larger than the size of the recording papers P. For instance, in the case that the recording papers P have inadvertently been set upside down, in the case that the recording papers P are to be removed which cannot to be used because the papers have been stored in the cassette 17 and so suffered from deformation or change of quality, or in the case that other types of recording media are to be replaced with, fingers can be inserted through the aperture 17i and the recording papers P can be pushed upward to remove them from the cassette. In addition, by utilizing the aperture 17i and a switch SW3, it is possible to judge the presence or absence of the recording papers P. In this case, a reflection type optical sensor is preferable for the switch SW3, but any other type of detectors can be used.

As seen from the above embodiment, since the paper feeder cassette 17 is formed at the bottom thereof with the aperture 17i large enough to enable the insertion of a finger therethrough, the removal and replacement of the recording papers P can be carried out with ease. And in addition, it is sufficient if only the size of the cassette 17 is slightly larger than the size of the recording papers, to which the miniaturization of the paper feeder cassette 17 itself is attributable. In FIG. 5, reference SW4 represents a switch for detecting whether the cassette 17 is properly mounted or not.

Paper Feeding System

The flow of the recording paper P will be briefly described with reference to FIG. 5.

FIG. 5 shows a state wherein the paper cassette 17 and ink cartridge 12 have been mounted from the front side, and paper feeding is carried out in the direction substantially perpendicular to the mounting direction of those cassette 17 and cartridge 12. In particular, as the paper feeder roller 120 rotates, the uppermost of the recording papers P is separated, and that single sheet of paper is fed between paper guides 143 and 146a until it abuts the junctions portion between the platen roller or platen 101 and the resist roller 103. Further, the sheet paper is delivered by the paper feeder roller 120 to form a loop between the paper feeder roller 120 and the resist roller 103. Thereafter, as described later, as will be the platen 101 is moved to rotate, the sheet paper is further delivered by tight contact with the platen 101 which is caused by a presser spring 102. Succeedingly, the sheet paper is further fed by being held between the platen 101 and the pinch roller 104. In printing, the platen 101 feeds the recording paper P stepwise. After completion of printing, the recording paper P passes between paper guides 144 and 146 and is ejected by ejection roller pair 124 and 145 into the stacker 5 with the printed face direction upward.

The paper guides are made of transparent material, and also the upper plate 1a forming part of the apparatus frame is made of transparent material as already described. The guide member for passing the recording medium between the platen roller, and the portion forming part of the apparatus corresponding to the guide member, are both made of transparent material. Therefore, it is possible to grasp the printing quality immediately after printing without touching the recording medium. Furthermore, it is possible to quickly have another try at printing or adjust the image characteristics, without deteriorating the paper feeding precision.

Paper Feeding Mechanism

The paper feeding mechanism will be described in detail.

Figure 8:
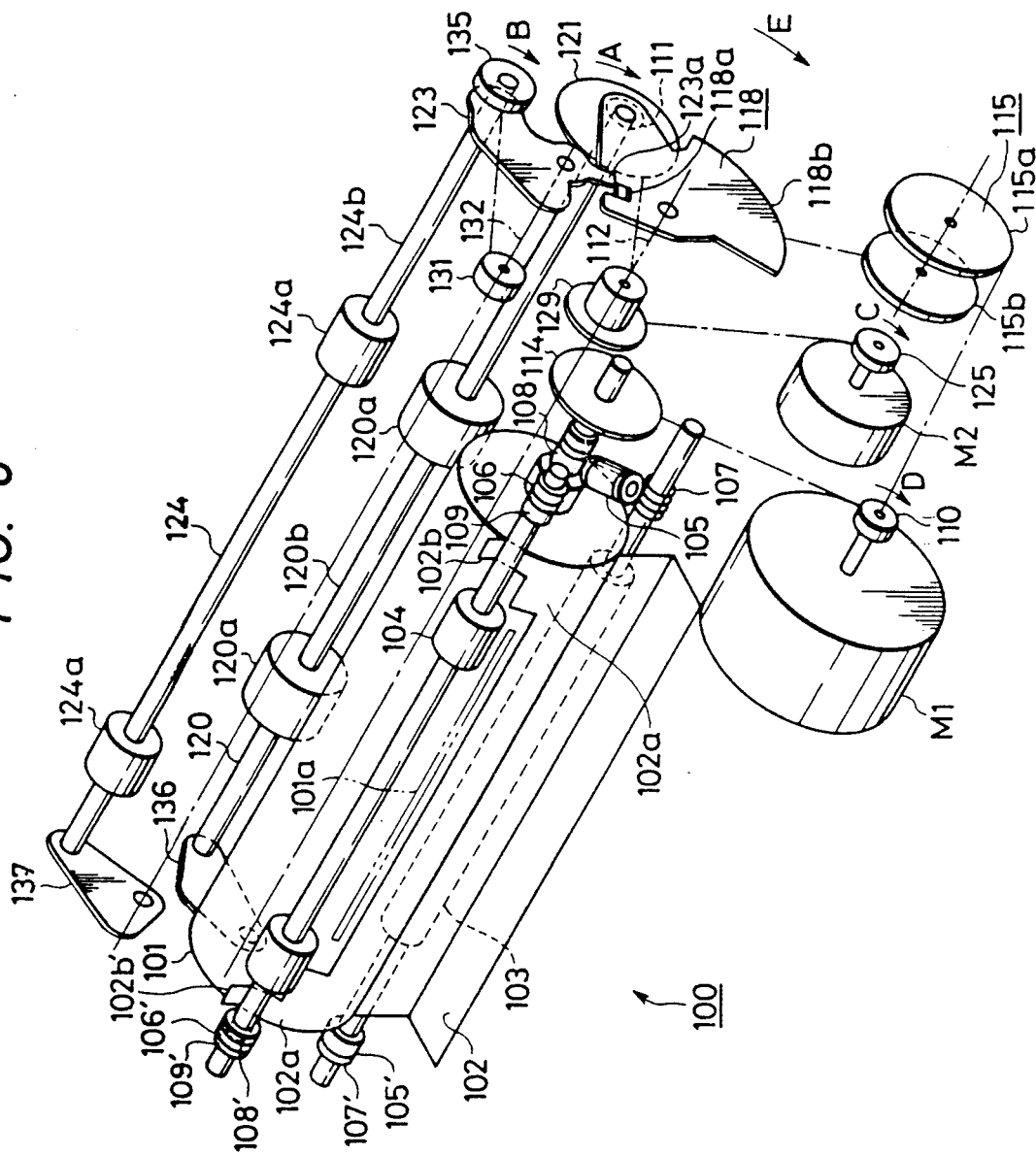
FIG. 8 is a first perspective view showing the environs about a platen.

In FIG. 8, numeral 101 represents the platen for feeding a sheet paper, the platen 101 being supported by (unillustrated) bearings mounted in side walls 151 and 152 (FIG. 7).

The platen 101 is made of for example an elastic body such as rubber (the shaft of the platen is made of metal), however the materials are not limited thereto. Numeral 102 represents the paper presser spring, which is fixed at one side thereof to a carriage base plate 216 (FIG. 7) described later. The curved portions 102a and 102a' (referred to as R portions hereinafter) are in contact with the platen 101 so as to impart a suitable contact pressure thereto. Guide portions 102b and 102b' guide the recording paper P near to the pinch roller 104 so as to make the recording paper P smoothly and without loosening thrust into the junction portion between the pinch roller 104 described later and the platen 101. The guide portions 102 and 102b' are not in contact with the platen 101, but have a slight clearance therebetween. Therefore, loosening in the recording paper P does not occur at the region from the R portions 102a and 102a' of the paper presser spring 102 to the junction portion between the pinch roller 104 and platen 101, resulting in the integral movement of the platen 101 and the recording paper P without causing any slip therebetween.

Numeral 103 represents the resist roller, which is rotatably supported by a paper guide 143 and contacts the platen 101 at a contact pressure f1 by means of springs 105 and 105' (FIG. 5) through sleeves 107, 108, and 107, 107'. In the present embodiment, the junction portion between the platen 101 and the pinch roller 103 is constructed to extend over the whole width of the recording paper. The reason for this is to prevent any creases or holds in the recording paper, even when a deformed recording paper such as a curled paper comes to the junction portion and the top end of the paper is aligned at the junction portion.

Numeral 104 represents the pinch roller, which is rotatably supported by a transparent paper guide. The pinch roller 104 is in contact with the platen at a contact pressure f2 by means of springs 106 and 106' (FIG. 5) through sleeves 109, 108 and 109', 108'. The junction portions between the pinch roller 104 and the platen 101 are disposed only at the vicinity of the guide portions 102 and 102' of the paper presser spring 102 described previously, that is, disposed only at both end portions of the recording paper P. This arrangement has been made in view of the fact that the middle portion of the recording paper P is fed slightly floating up from the platen 101 due to the cutaway portion formed in the paper presser spring 102 at the printing position. In particular, if the junction portions are so arranged to have contact over the whole width of the recording paper as in the case of the resist roller 103, creases in the recording paper may arise in this case. This is because only opposite end portions as above are subjected under pressure.

By virtue of the provision of the platen 101, paper presser spring 102, resist roller 103, and pinch roller 104, the feeding precision for the recording paper, evenness in the recording section, and the like can be assured. More in particular, the top end of a recording paper which has been aligned by the platen 101 and resist roller 103, is fed under rotation of the platen 101 between the platen 101 and paper guide 143 (FIG. 5), and in turn further fed between the R portions 102a and 102a' of the paper presser spring 102 and the platen 101. Up to this position, the wound angle of the recording paper relative to the platen 101 is small, a suitable clearance between the platen 101 and the paper guide 143 exists, and the recording paper P is pushed into between the platen 101 and resist roller 103. Heretofore, it is not assured that the recording paper P is fed without slippage between the platen 101. At the region from the R portions 102a and 102a' of the paper presser spring 102 to the guide portions 102b and 102b', and the pinch roller 104, the recording paper P is fed in tight contact with the platen 101. At the next region, the recording paper 101 is rolled up by the platen 101 and the pinch roller 104. At the succeeding region from the R portions 102a and 102a' at the printing position to the platen 101 and the pinch roller 104, the recording paper is maintained in tight contact and moreover a large wound angle is ensured. Considering the above conditions, there is no slip between the recording paper P and the platen 101, but both are fed as a unit. In addition, a sufficient evenness at the printing position can be assured. As well known, if a sufficient evenness is not obtained, the recording paper P may contact with the heads described later, or because of misaligned distances between the heads and the recording paper P, a drop of ink jetted out of the head may be bombarded onto a position displaced from a target along a main scanning direction. Thus, the quality of printing is remarkably degraded. Further, as to the feeding precision of the platen 101 along the sub-scanning direction, if there is any slip between the recording paper P and the platen 101, displacement from the target bombardment point along the sub-scanning direction may also occur.

Further in the present embodiment, the unstability of the platen 101 due to vibrations from a motor M1 is eliminated under the pressure exerted by springs 105, 105', and 106, 106'. In particular, the platen 101 is made to have a suitable load as seen from the driver side so that even if there is play such as from a backlash of gears in the platen drive mechanism, the platen 101 will not fluctuate and thereby performs a sufficient position setting function.

The reason that the sleeves 107, 107', 108, 108', 109, and 109' are used for setting the springs, is to eliminate twists, tangles, or the like of the springs 105, 105', 106, and 106', which might otherwise be caused by the rotation of the platen 101, and to obtain a smooth rotation of the platen 101. The material of the sleeves is preferably a low friction coefficient material such as plastics.

The relation between contact pressures f1 and f2 is preferably set so as to suffice:

$$f1 > f2 \qquad (2)$$

in view of paper feeding precision and stability. In the present embodiment, the platen 101 is made of rubber, while the resist roller 103 and pinch roller 104 are made of metal. In addition, the spring forces of the springs 105, 105' and 106, 106', were changed so as to suffice the inequality (2). Since the purpose of the inequality (2) is to make the platen 101 and the pinch roller 104 as the main drive for the paper feeding, the following structure is also applicable. That is, a spring is suspended between the resist roller 103 and the pinch roller 104 through sleeves. Of course, independent springs may be suspended as in the present embodiment, or different spring forces may be employed for each spring. In the structure, materials for the pinch roller 104 and the resist roller 103 are changed, and the friction coefficient of the pinch roller 104 is set larger than that of the resist roller 103.

Without the pinch roller 104, for instance, the top end of the recording paper P may get into the stacker 5, and in this condition if the top end of the recording paper P comes into contact with the stacker, then the precise position of the paper P under printing is influenced. In this connection, since a heavy loaded spring is suspended between the platen 101 and the pinch roller 104 to serve as a main drive, the printing precision is less susceptible to external influences during printing operation. In FIG. 5, references SW1 and SW2 respectively represent switches for detecting the presence or absence of recording papers near the corresponding rollers 103 and 104.

Drive Mechanism for Paper Feeding

Next, the drive mechanism for paper feeding will be described with reference to FIG. 8.

First, the rotation of the platen 101 will be described.

Reference M1 represents a pulse motor, and numerals 110 and 114 represent gears for transmitting the rotation of the pulse motor M1 to the platen 101. The gear ratio is determined by the advance angle of the pulse motor M1. These gears are rotatably supported on and about the respective shafts fixed to a side wall 151 (FIG. 7).

Next, the paper feeding section will be described.

Numeral 115 represents a known friction clutch which is constructed of gears 115a and 115b and (unillustrated) springs. The gear 115a is coupled to the motor M1 by means of not shown gears, while the gear 115b engages a gear 118b of a sector gear 118 via a gear 116b, and is rotatably supported on the side wall 151. The sector gear 118 is formed with a cutaway portion 118a. The sector gear 118 concentrically with a gear 129 described later is rotatably supported on the side wall 151 (FIG. 7). The gear 129 is rotatably supported on the side wall 151 and coupled to a motor M2 through a gear 125.

The shaft 120b of the paper feeder roller 120 is rotatably supported by the sector gear 118. Therefore, the shaft 120b swings up and down under rotation of the sector gear 118. Numeral 121 represents a gear which is coupled to the paper feeder roller shaft 120b via a uni directional clutch 111 and is coupled to the gear 129 via a not shown gear. As a result, the paper feeder roller 120 is driven into rotation only in the arrow A direction in response to the directional (the arrow C direction) rotation of the motor M2, with the aid of the paper feeder roller 120, gears 125, 129, and 121, and uni directional clutch 111. Even if the sector gear 118 rotates, the coupling between the gears 129 and 121 is not hindered since the sector gear 118 rotates concentrically with the gear 129.

The paper feeder roller 120 is constructed of a metallic shaft 120b and an elastic roller portion 120a fixed thereto and made of such as rubber. The paper feeder roller 120 is supported between the sector gear 118 and an oppositely located and rotatable side wall 136. In particular, under operation of the pulse motor M1, the roller portion 120a moves while swinging up and down and the roller 120 as a whole rotates under operation of the motor M2. The two movements are independently controlled. The side wall 136 is rotatably supported by a side wall 151.

Now, the drive section of the ejection roller 124 will be described. The ejection section is constructed of a side wall 123 with a curved portion 123a, side wall 137 confronting the side wall 123, gears 131, 135, and ejection roller 124. The side walls 123 and 137 are rotatably supported by the side walls 151 and 152 shown in FIG. 7, respectively. The ejection roller 124 is constructed of a metallic shaft 124b and an elastic roller portion 124a fixed to the shaft 124b. The ejection roller 124 is rotatably supported by the side wall 123 and side wall 137 confronting the side wall 123.

The gear 131 is rotatably supported by the side wall 151 and is coupled to the gear 129 through a (unillustrated) gear and to the motor M2. The gear 131 meshes through a not shown gear train with a gear 135 fixedly mounted on the ejection roller shaft 124b. Consequently, the rotation of the motor M2 is transferred to the gear 135. In this case, by adjusting the number of gears, the motor is so arranged to rotate reversely relative to the paper feeder roller 120. In particular, as the motor M2 is driven into rotation in the direction opposite to the drive direction (arrow C) of the paper feeder roller, the ejection roller 124 rotates in the arrow B direction, that is, in the withdrawal direction of recording paper P. The side wall 123 concentrically with the gear 131 is rotatably supported on the side wall 141, while the curve portion 123a engages with the cutaway portion 118a of the sector gear 118. Therefore, upon rotation of the sector gear 118, the side wall 123 rotates about the supporting shaft, while the ejection roller shaft 124b swings up and down.

Under operation of the motor M1, if the sector gear 118 rotates in the arrow E direction, the paper feeder roller shaft 120b moves downward, while the ejection roller shaft 124b moves upward. Thus, an enabled state for paper feeding is brought about. In contrast, if the sector gear 118 rotates in the reverse direction, then the respective roller shafts 120b and 124b move in the opposite directions to their respective retreat positions. In the paper feeding enabled state, if the motor M2 rotates in the arrow C direction, the paper feeder roller 120 rotates in the paper feeding direction (arrow A) with the aid of the gear 121 to thereby perform paper feeding. At this time, although the ejection roller 124 rotates in the direction opposite to the withdrawal direction, no problem arise since the recording paper P is not present at the ejection roller at that time.

Thereafter, the recording paper P is fed by the platen 101. At the time of withdrawal, the motor M2 rotates in the direction opposite to the arrow C, and the ejection roller 125 rotates in the withdrawal direction. The paper feeder roller 120, on the other hand, does not rotates due to the provision of the uni directional clutch 111 and does not influence the withdrawal operation.

Although the side wall 123 and the sector gear 118 have been described as separated members for the simplicity of description, a single integrated member can also be used. In this case, the rollers 120 and 124 do not move to opposite directions, but they move to the same direction.

Release and Reset Mechanism for Resist and Pinch Rollers

Figure 9:
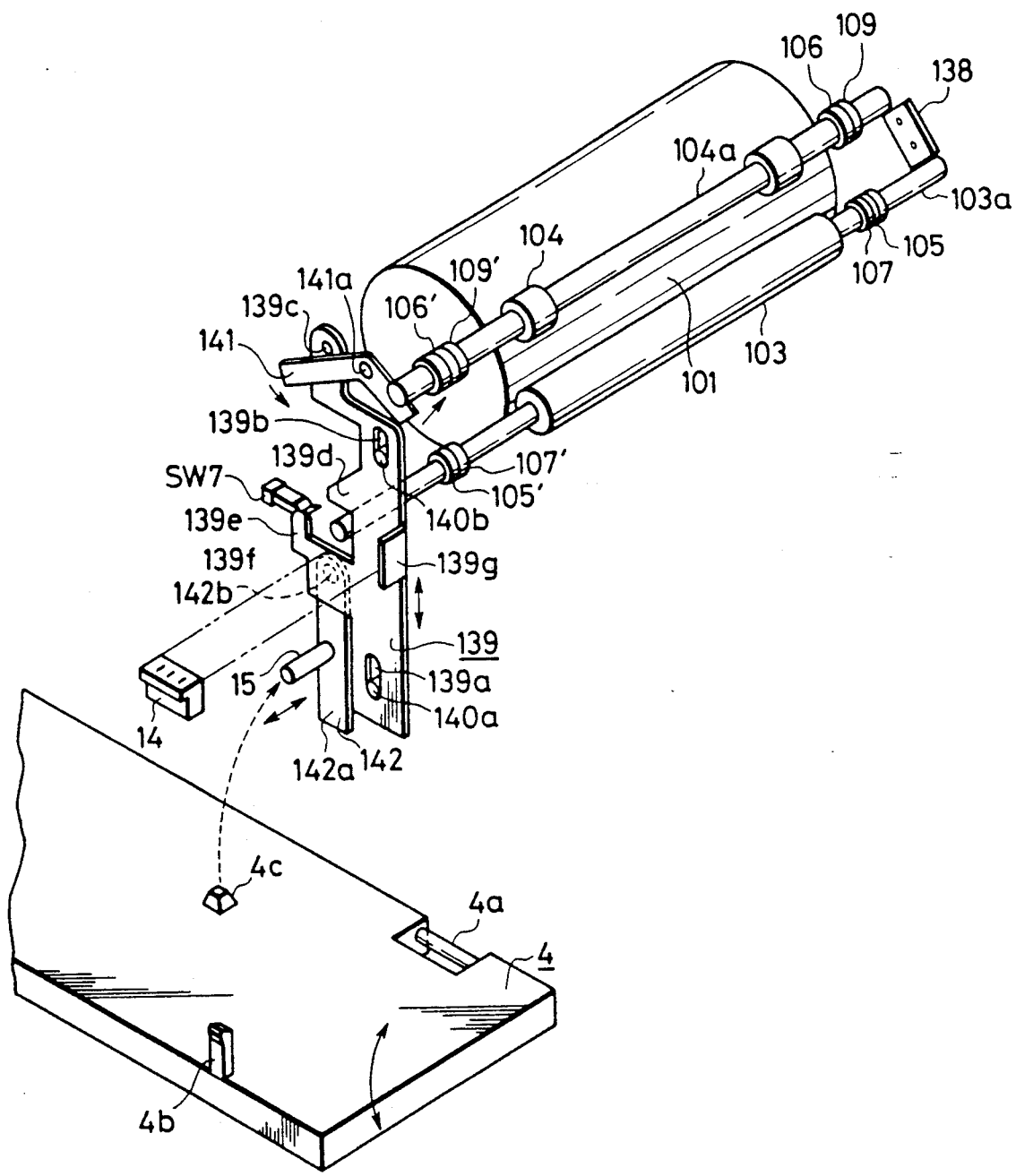
FIG. 9 is a second perspective view showing the environs about the platen.

The release and reset operations for the pinch and resist rollers 104 and 103 brought into tight contact with the platen 101 will be described with reference to FIG. 9.

Numeral 138 represents a stopper for releasing the pinch roller 104 and the resist roller 103, which stopper is fixed on the side wall 151.

Numeral 139 represents a release lever slidably supported to the side wall 152 by means of pins 140a, 140b, guide grooves 139a, 139b. The release lever 139 is constructed of an operation section 139g (curve portion) coupled to the release knob 14 (FIGS. 3 and 4) by means of (unillustrated) members, pin 139c, arm portion 139d, switch operation section 139e, and stopper section 139f. Switch SW7 is a switch which turns on at the set position (recording position) of the pinch roller 104 and the resist roller 103.

Numeral 141 represents a lever rotatably supported about a shaft 141a, and numeral 142 represents a leaf spring the lower end 142a of which is fixed to the side wall 152. A stopper pin 142b and the reset button 15 (FIGS. 3 and 4) are fixed at the middle and the upper end of the lever 141, respectively. Numeral 4 represents the front cover, reference 4a represents a hinge coupled to the main body of the apparatus, reference 4b represents a lock nail, and reference 4c represents a protrusion portion fixed at the position for depressing a reset button 15 as the front cover 4 is rotated about the hinge 4a so as to close it.

(1) Release Operation for Pinch and Resist Rollers

It is necessary to make it easy to pull out jammed recording papers P. In such case, by pushing down the release knob 14, the release lever 139 slides down with the help of the guide grooves 139a, 139b, and the pins 140a, 140b. At that time, the pin 139c pushes the lever 141 to make it rotate about the shaft 141a counter-clockwise and push up the pinch roller 104. At the same time, the arm section 139d pushes down the resist roller 103. Then, one ends of both roller shafts 141a and 103a are pulled away from the platen 101 using the end face of the stopper 138 as a fulcrum. Upon further depression of the release lever 139, the pin 142b of the leaf spring 142 is rides upon the stopper section 139f by its own spring force.

With these operations, the contact between the platen 101 and the pinch and resist rollers 104 and 103 is intercepted so that the paper entangled around the platen 101 can readily be removed therefrom.

(2) Reset Operation for Pinch and Resist Rollers

Next, after the removal of the entangled paper, in order to set respective rollers 103 and 104 at the recording position (as shown in the figure), the reset button 15 is pushed down against the spring force of the leaf spring 142. With this operation, the contact between the stopper pin 1432b and the stopper section 139f is intercepted. Thus, by virtue of the spring forces of the springs 105, 105', 106, and 106', the pinch roller 104 and the resist roller 103 contact with the platen 101 to return to the initial position. Concurrently therewith, the lever 141 rotates with the help of the roller shaft 104a to thereby push up the pin 139c and hence the release lever 139. So, the switch SW7 turns on and each member is set at the recording position as shown in the figure.

The above operations are actuated by the operator by depressing the reset button 15. However, since the protrusion portion 4c also pushes the button 15, the mere closing operation of the front cover 4 sets the rollers. As above, both rollers 103 and 104 return to the recording position.

It is seen from the above that without positively depressing the button 15, both rollers 103 and 104 can be automatically reset by merely closing the front cover 4.

Heads and Ink Supplying System

Next, heads and the ink supplying system 200 of the present embodiment will definitely be described.

Figure 10:
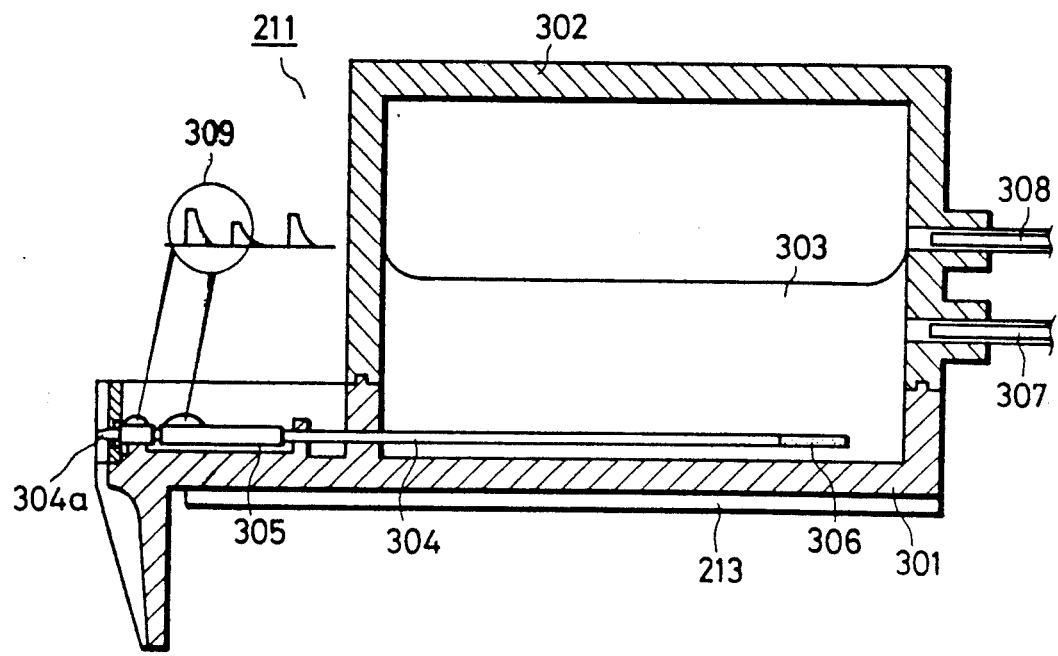
FIG. 10 is a cross sectional view of an inkjetting head unit.

As particularly shown in FIG. 10, the basic structure of each head of a head unit 211 includes a sub tank body 301 and a sub tank lid 302 integrally mounted to the tank body 301. In the present embodiment, there are provided four (Y: yellow, M: magenta, C: cyanine, B: black) independent ink reservoirs 303 along the direction perpendicular to drawing surface. Each ink reservoir has a corresponding nozzle unit mounted. The nozzle unit is constructed of a tubular nozzle 304 made of such as glass, tubular piezoelectric element 305 (electricmechanical pressure transducer) connected with adhesive around the nozzle 304, and filter 306 for preventing mixing foreign minute matter into the nozzle 304 and adjusting the flow resistance of ink. By applying a drive pulse 309 to the piezoelectric element 305, the nozzle 304 contracts with the piezoelectric element 304 to thereby jet out ink drops from the orifice 304a formed at the tip thereof.

Numeral 307 represents an ink supply tube for supplying ink in an ink tank bag 355 housed within the ink cartridge 12, and numeral 308 represents a restoration tube communicating with a pump unit 400 for restoring for example a clogged state of the nozzle 304.

In order to avoid an unstable condition in ink jetting due to the change of the characteristics (particularly, drastic variation in viscosity) of ink at low temperature, a heater 213 is attached beneath the sub tank body 301 of the head unit 211. The heater 213 maintains the temperature of the ink in the sub tank constant by driving an (unillustrated) control circuit in accordance with the temperature of the ink itself or the atmosphere measured with a temperature measuring element such as not shown thermistor.

The detailed construction of the ink cartridge 12 and the mounting and dismounting to the printer will be described in detail.

Figure 11:
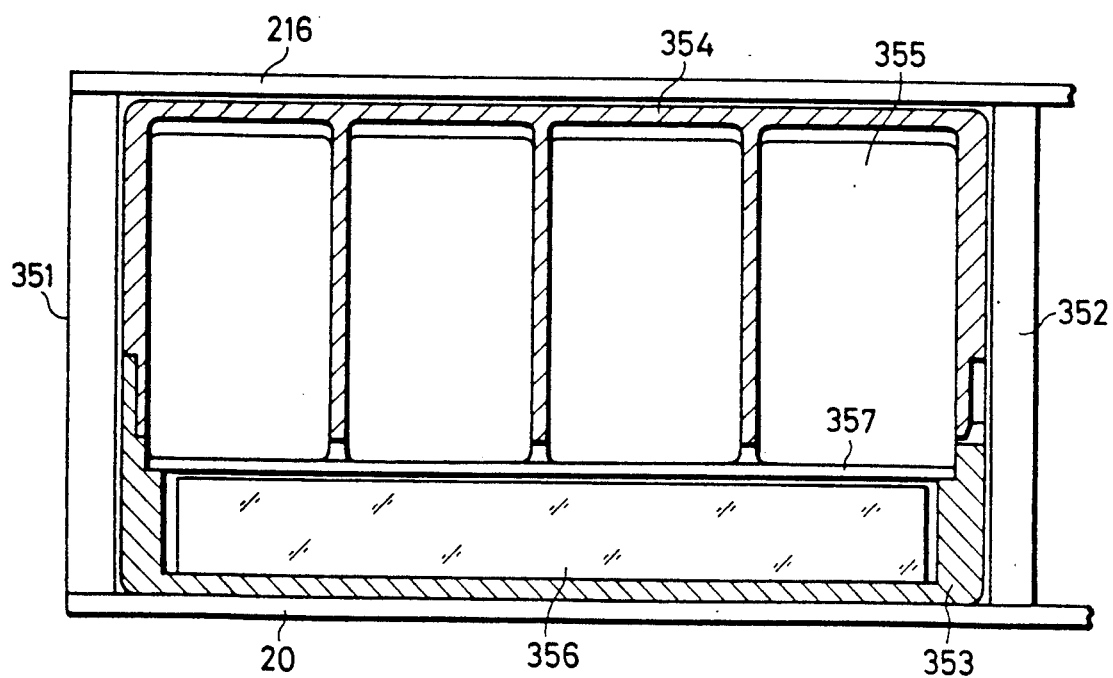
FIG. 11 is a cross sectional view of an ink cartridge cut along a line V—V' of FIG. 7.
Figure 13:
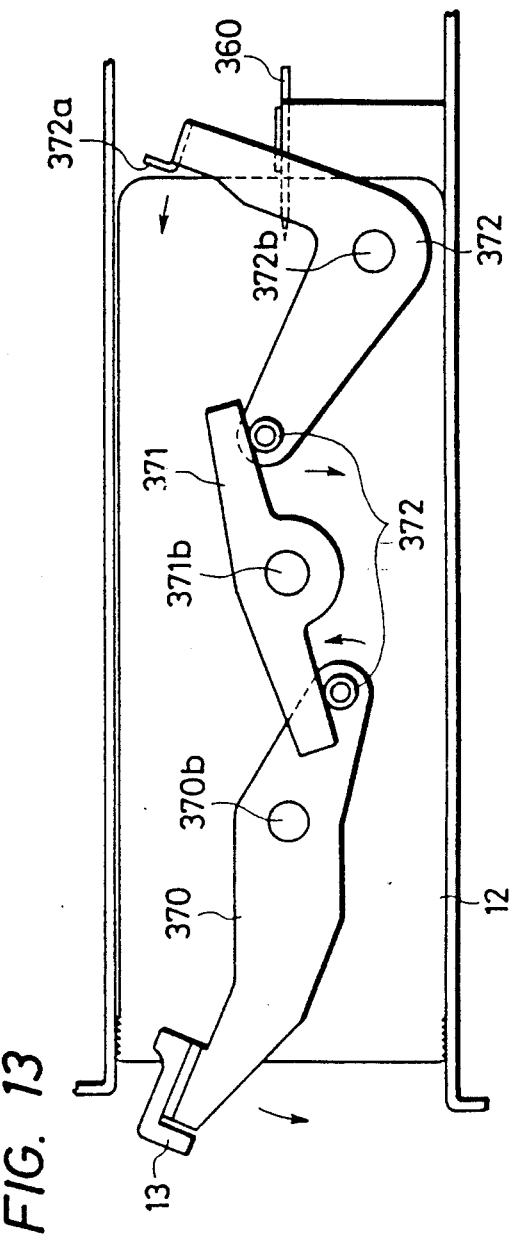
FIG. 13 is a view showing a dismounting mechanism for the ink cartridge.

Referring to FIG. 11, the ink cartridge 12 is inserted from the operation side of the apparatus (FIGS. 3 and 4) into the space defined by the main frame 20, carriage base plate 216, and right and left guide plates 351 and 352. FIG. 11 is a cross sectional view along a line W—W' of FIG. 7, which shows a state that the ink cartridge 12 is housed to form an ink supply passage. FIG. 13 shows an arrangement how the ink cartridge 12 is removed from the printer, which is shown as seen from the Z direction in FIG. 7.

Figure 12:
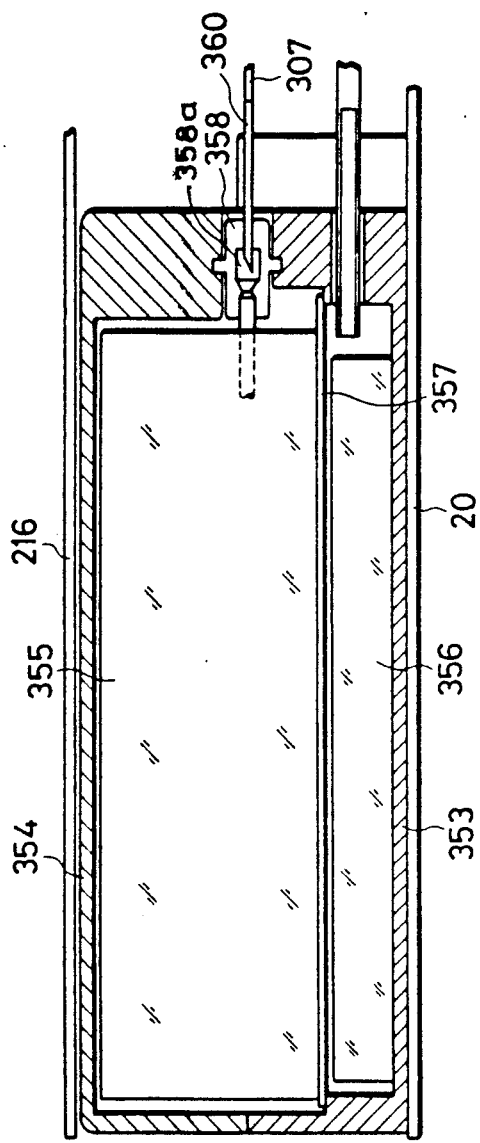
FIG. 12 is a cross sectional view of the ink cartridge cut along a W—W' of FIG. 7.

Referring to FIGS. 11 and 12, the ink cartridge 12 is constructed of a cartridge main body 353, cartridge lid 354, main tank bags 355 for containing inks of various colors Y, M, C, and B, waste ink absorber 356, and partition plate 357. In the present embodiment, the main tank bags 355 including four (Y, M, C, B) bags are housed in the longitudinal direction (or perpendicular direction relative to the drawing surface), and the waste ink absorber 356 is positioned below the main tank bags 355 separated by the partition plate 357. The coupling between the cartridge main body 353 and the cartridge lid 354 is effected during the assembly process for mounting both members integrally by means of a known nail method.

At one end of the main tank bag 355, a rubber plug 358 is attached integrally with the main tank bag 355. The rubber plug 358 is fixedly held between the cartridge main body 353 and the cartridge lid 354.

The ink cartridge 12 is mounted onto the printer by directing the rubber plug 358 side to the interior of the printer. In this case, a hollow needle 360 fixed at the printer body penetrates the rubber plug 358 to extend into an ink chamber portion 358a in the rubber plug. Therefore, a necessary ink supplying passage is completed to supply ink to the ink reservoir 303 of the head unit 211 through a flexible supply tube 307. The waste ink absorber 356 is for absorbing waste ink from the restoration system described later. The supply of ink from the main ink tank bags 355 to the respective four ink reserviors 303 is performed through the respective four flexible supply tubes 307. In particular, every time a one drop of ink is jetted out, the ink is supplied to the ink reservoir 303 from the main tank bag 355 under capilary action. The other end of the flexible supply tube 307 is coupled to a hollow needle 360 fixed to the printer body at the position almost near to the middle of the carriage running span. As described above, the rubber plug 358 attached at the end of the main tank bag 355 is made to couple to the hollow needle 360 as the ink cartridge 12 is driven into the mounting state. Thus, the tip of the hollow needle 360 reaches the hollow portion in the rubber plug 358 to which ink has already been filled, thereby completing an ink passage.

Next, the removal of the ink cartridge 12 from the printer main body will be described.

In FIG. 13, numeral 13 represents the release knob for releasing the ink cartridge, and numerals 370, 371, and 372 represent levers turning about respective shafts 370b, 371b, and 372b. The lever 372 is formed with a presser face 372a which contacts with the ink cartridge surface at the side of the rubber plug for the purpose of pushing out the ink cartridge 12. By pushing down the knob 13, the levers 370, 371, and 372 are respectively pivoted in the arrow directions to thereby urge the presser face 372a to push out the ink cartridge 12 toward the operation side.

It is noted that it is very difficult to pull out the ink cartridge 12 once it has been completely housed within the printer main body. The reason for this is that no marginal portion exists for accessing with fingers to the ink cartridge 12 and that it requires a greater force than expected to pull out the hollow needle 360 from the rubber plug 358. In view of the above, in the present embodiment, cooperative motions of the levers are utilized for the removal of the cartridge so that with a small strength the coupling between the hollow needle 360 and the rubber plug 358 may be released. Thereafter, by virtue of the structure of the embodiment, the ink cartridge 12 can be manually pulled out. Once the rubber plug 358 of the ink cartridge 12 is removed from the hollow needle 360, the ink cartridge 12 slightly (for example, on the order of 30 mm) projects out of the printer main body. Thereafter, the ink cartridge 12 can easily be pulled out manually. In FIG. 5, reference SW5 represents a switch for detecting whether the ink cartridge is mounted properly.

Scanning Mechanism for Carriage

Figure 14:
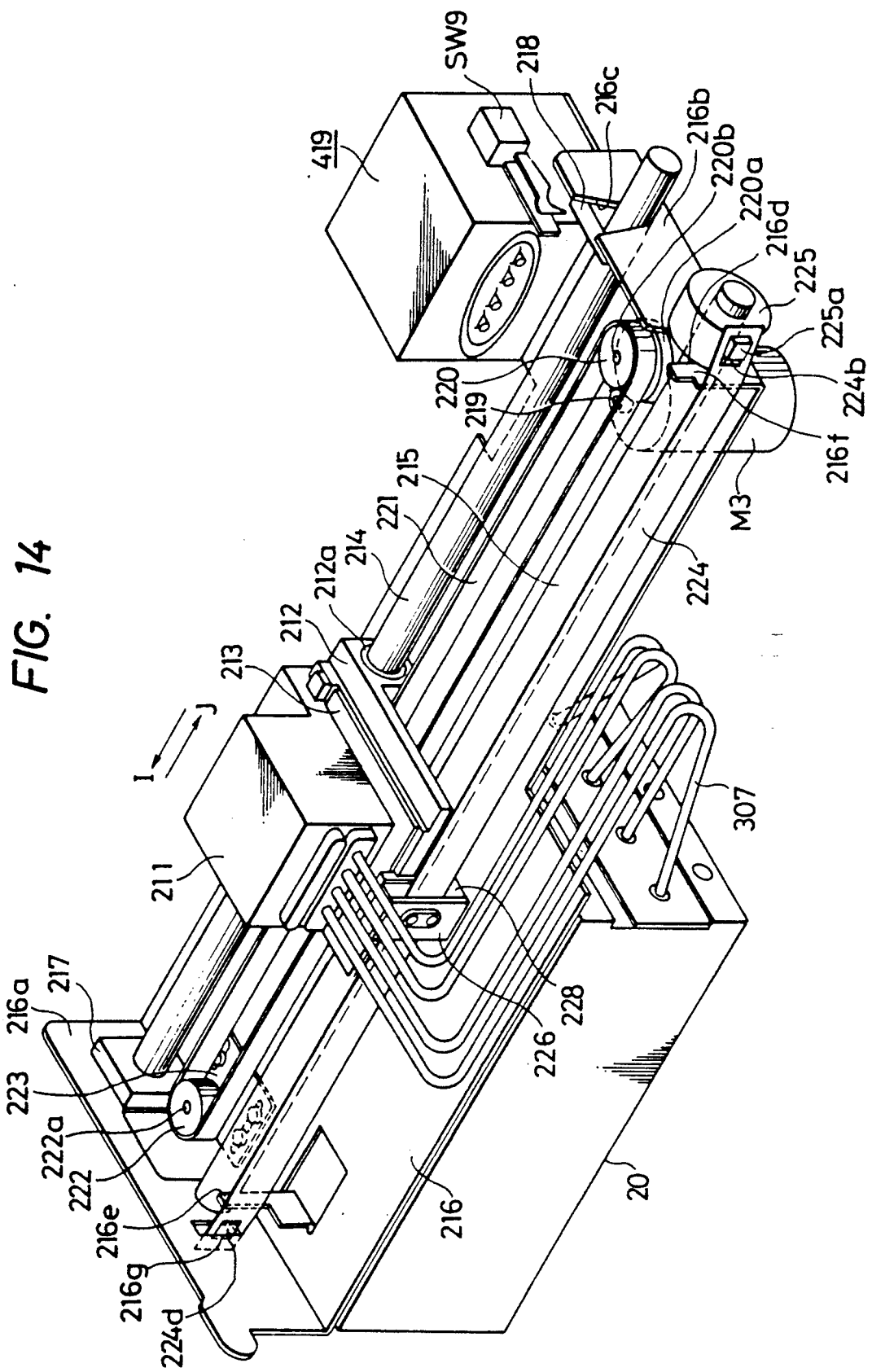
FIG. 14 is a perspective view showing a recording mechanism of the apparatus.

Referring to FIG. 14, the head unit 211 is fixed to the carriage 212. Numeral 211 represents the heater disposed between the head 211 and the carriage 212, for controlling using the (unillustrated) temperature measuring element such as a thermistor to maintain ink at a preset temperature, as previously described.

Numerals 214 and 215 represent guide shafts, and numeral 216 represents a carriage base plate. One end of each guide shaft 214, 215 is fixed by a screw to the left side plate 216a of the base plate 216, while the other ends of the guide shafts 214 and 215 are supported by cutaway grooves 216c and 216d formed in the right side plate 216b of the base plate 216. Numerals 217 and 218 represent oil reservoir members which for instance supply oil to the bearing 212a of the carriage 212 when the carriage contacts with the reservoir members before or after printing. Numeral 219 represents a pinion mounted on a motor M3, the pinion meshing with the gear portion 220a of a belt pulley 220. The belt pulley 220 is rotatably supported about a shaft 220b fixed upon the carriage base plate 216, for driving a timing belt 221 with the drive power of the motor M3. The timing belt 221 is suspended between the belt pulley 220 and an idler pulley 222, and a portion of the belt pulley 220 is fixed at the lower position of the carriage 212. Therefore, as the belt 221 moves, the carriage 212 moves on the guide shafts 214 and 215. The idle pulley 222 is rotatably supported about a shaft 222a fixed on a slide plate 223. The slide plate 223 is fixedly mounted on the carriage base plate 216 such that the timing belt 221 is retained under proper tension.

Numeral 224 represents a fixed slit plate for a linear encoder, the slit plate 224 being suspended generally parallel to the guide shaft 214 between slit plate receptacles 216e and 216f of the carriage base plates 216 and 216'. The fixed slit plate 224 is formed at both end portions with apertures 224d and 224e, one of the apertures 224d being engaged with a protrusion 216g of the left side plate 216a of the carriage base plate 216 and the other of the aperture 224e being engaged with the hook portion 225a of a tension member 225. The tension member 225 is mounted adjustable in position on the end portion of the guide shaft 215, and an (illustrated) spring coupled to the tension member gives a proper tension to the fixed slit plate 224.

Figure 15:
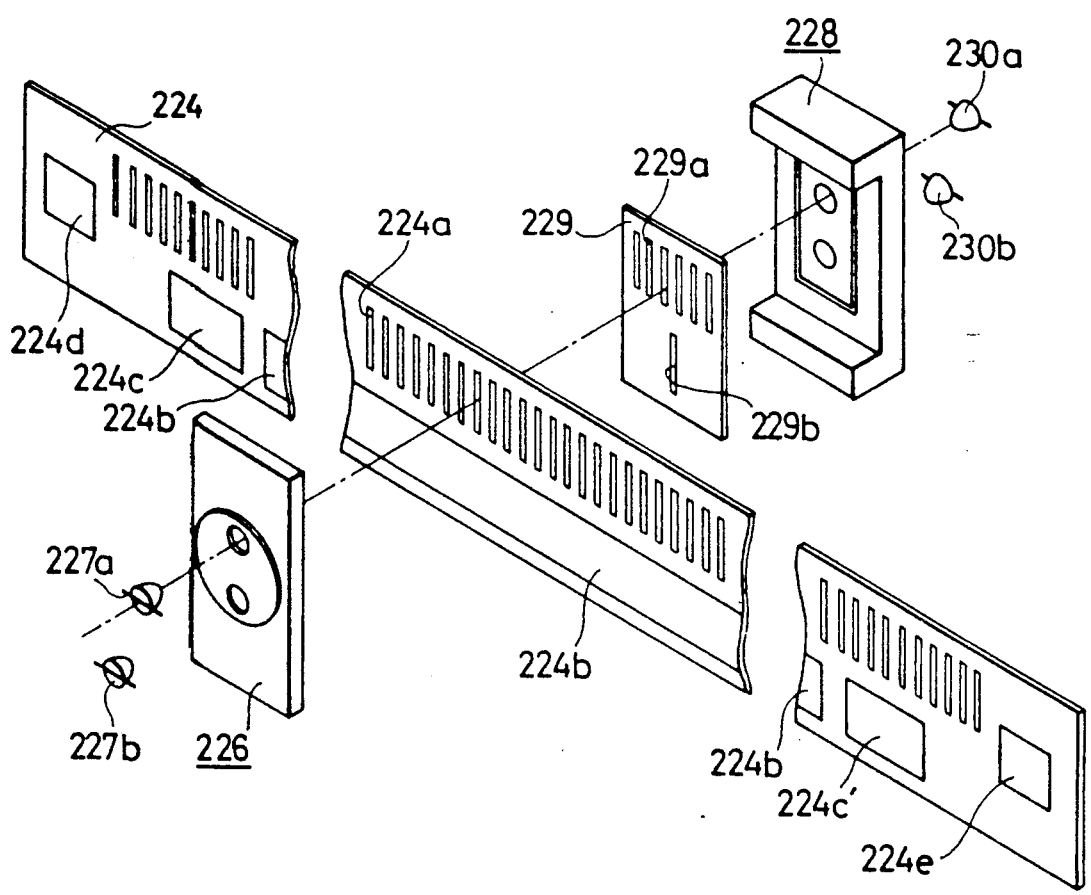
FIG. 15 is a detailed perspective view of an encoder unit.

As particularly shown in FIG. 15, the fixed slit plate 224 is formed with slits 224a at the upper position and formed with zone slits 224b at the lower position. Numeral 226 represents a light emission unit of the linear encoder on which unit light emission elements 227a and 227b are fixedly mounted. Numeral 228 represents a light receiving unit of the linear encoder on which unit a movable slit plate 229 and light receiving elements 230a and 230b are fixedly connected. The movable slit plate 229 is formed, at the position corresponding to the equal pitched slits 224a at the upper position of the fixed slit plate 224, with the same equal pitched slits 229a. In addition, the movable slit plate 229 is formed, at the position corresponding to the zone slits 224b and 224c of the fixed slit plate 224, with a single slit 229b.

In FIG. 14, the switch SW9 is a switch which turns on as described previously when the carriage 212 is positioned at one end of the movement span of the carriage 212.

The ink cartridge 12 is disposed beneath the carriage base plate 216. The fixed ends at the side of the ink cartridge of the ink supply tubes 307 are located generally at the midst of the scanning range of the head unit 211 so as to keep the lengths of the supply tubes 307 at a minimum. The lower space of the carriage base plate 216 where the ink cartridge is not presented, is used as the space for movement of the ink tubes 307 and (unillustrated) flexible printed wires.

With such arrangement as the ink cartridge 12 disposed underneath the carriage base plate 216 serving as a supporting plate for the head unit 211, it is possible to obtain a suitable liquid head difference so that as previously described, ink is supplied from the ink tank bag 355 to the ink reservoir 303 of the head unit 211. As a result, while the overall height can be lower, the whole size can also be made smaller since the supply tubes 307 have the minimum lengths. Thus, an ink supply system with a high efficiency can be arranged.

Next, the operation will be described with reference to FIGS. 14 and 15. In the present embodiment, a DC motor is used as the motor M3 and the reciprocal movement of the head unit 211 is subjected to a DC servo control using an output from the linear encoder. Therefore, the carriage 212 moves reciprocally at an equal speed. In FIG. 14, the position at which the head unit 211 faces the capping unit 419 corresponds to the home position of the head unit 211. Usually, the head unit 211 is located at the home position after the end of the printing operation or during the turning-off of the power switch 6a. At this position, the bearing 212a of the carriage 212 contacts with the oil reservoir member 218 so that oil is supplied to the bearing. As the motor M3 is driven into operation upon a print start signal, the head unit 211 moves in the arrow I direction until the bearing 212a of the carriage 212 contacts with the other oil reservoir member 217. After oil is supplied, the carriage 212 is rendered to reversely move in the J direction.

In the present embodiment, two kinds of print sizes, large and small, can be selected. In particular, by manipulating the print size change-over switch 6g on the switch panel 6, it is possible to select either one of a large size (L) or a small size (S). In the embodiment, it is arranged to automatically select the small size (S) upon turning on the power switch 6a. Here for instance, the description is directed to the case that the user has selected the large size by pushing the print size change-over switch 6g. At this time the display LED 6h1 illuminates.

When the light emission and receiving units 226 to 228 of the encoder fixed on the head unit 211 moving in the J direction after oil is supplied, detects the zone slit 224c' in the fixed slit plate 224 shown in FIG. 15, the motor M3 is rendered to reverse and start the main scanning again in the I direction. More particular, light radiated from the light emission elements 227b inputs, via the zone slit 224c' and the slit 229b of the movable slit plate 229, to the light receiving element 230b. After detection of light by the light receiving element 230b, the motor M3 reverses. Light of the light emission element 227a passed through the equal pitched slits 224a of the fixed slit plate 224 intermittently reaches to the light receiving element 230a passing through the equal pitched slits 229a of the movable slit plate 229 moving with the carriage 212. The light receiving element 230 emits a corresponding on/off signal. In response to the signal, the motor M3 is subjected to servo control to make the carriage 212 scan at a constant speed. An on-portion or off-portion of the on/off signal corresponds to a one dot pixel, and the portions are used to control the timings for jetting out ink from the head. After the start of the above described second scanning of the head unit 211 (concurrently with the detection of the edge of the zone slit 224c' at the side of the home position), the presence or absence of image data is checked. If there is data, printing starts at the position corresponding to the data. Thereafter, ink is ejected out in accordance with image data to print out the image. As the head unit 211 is scanned in the I direction and the edge of the zone slit 224c at the side of the side plate 216a is detected, then the motor is rendered to stop. The presence or absence of an image data is again checked, and if there is image data, the motor M3 is rotated backwards. In this case, the head unit 211 is scanned in the J direction, and as similar to the foregoing operations, the printing operations are repeated. During the time the head unit 211 reverses from the I direction to the J direction, the platen 101 is driven with the motor M3 to stepwise advance a predetermined amount. Thus, a subscanning for the recording paper corresponding to one line is performed.

After completion of printing through repetitive such main and sub-scannings, the head unit returns to the home position. Thereafter, the recording paper is withdrawn into the stacker 5 in accordance with the previously described paper ejection operations, to thereby complete a series of printing and paper withdrawal operations.

Alternatively, in the case that the small size print mode is selected, the edges of the zone slits 224c and 224c' at the side of the zone slit 224b are detected to effect the reverse operation of the carriage. Consequently, the small size printing is carried out within the width of the zone slit 224b, while the large size printing is carried out within the width between both ends of the zone slits 224c and 224c'.

Control Circuit

FIG. 16 shows a control circuit system of the apparatus constructed as above. In the figure, numeral 901 represents an input signal group including a RGB signal, NTSC signal, PAL signal, SECAM signal, and external input data signal from such as a personal computer. Numeral 902 represents an input signal processing circuit which converts the respective TV signals of NTSC, PAL, and SECAM into R, G, and B three primary chrominance signals. Numeral 903 represents an A/D convertor, numeral 904 represents a line memory for storing several line data, and numeral 905 represents an interpolation circuit which is operated during the large size printing. Numeral 906 represents an image processing circuit for executing masking disposal, back color removal disposal and the like. Numeral 907 represents a D/A convertor, numeral 908 represents a head driver, numeral 909 represents the ink jet head including the previously described piezoelectric element 305, numeral 910 represents an input switch group including the power switch 6a, print switch 6c, stop switch 6e, pump switch and the like, and numeral 911 represents a central processor unit (referred to as CPU hereinafter) which in order to control the whole system, stores programs having particular flows shown in FIG. 17 and so on into an (unillustrated) ROM. Numeral 913 represents a pump system sensor, numeral 917 represents a temperature sensor, numeral 918 represents a heater control circuit for controlling the temperature of the heater 218, numeral 920 represents an encoder sensor, numeral 921 represents a driver for the carriage motor M3, numeral 923 represents another driver for the motor M1, numeral 925 represents still another driver for the motor M2, and numeral 927 represents a display driver for driving a display group 928. The display group includes the display LEDs 6b, 6d, 6f, 6h, 6i, 6j, and 6ls. The CPU 911 gives access to the following detector switches.

The switch SW1 (FIG. 5) is a switch for detecting the presence or absence of recording paper near the resist roller 103. SW2 (FIG. 5) is a switch for detecting the presence or absence of a recording paper near the pinch roller 104. SW3 (FIGS. 5 and 7) is a switch for detecting the presence or absence of a recording paper within the cassette. In the present embodiment, the switches SW1, SW2, and SW3 are for example reflection type switches. Other mechanical switches may also be used however. The switch SW4 (FIG. 5) is a switch for detecting whether the ink cartridge 12 is mounted or not, the switch SW7 (FIG. 9) is a switch for detecting whether or not the resist roller 103 and pinch roller 104 are pushed in tight contact with the platen 101, the switch SW7 being provided since that the resist roller 103 and the pinch roller 104 are released from the platen 101 during a jamming disposal, which will be later described. The switch SW8 (FIG. 5) is a switch for detecting whether the stacker 5 is mounted or not. The switch SW9 (FIG. 14) is a switch for detecting whether the head is at the home position or not, and the switch SW10 (FIG. 5) is a switch for detecting the presence or absence of a recording paper at the paper ejection outlet.

FIGS. 17 to 22 show operation flows in accordance with the programs stored in the CPU 911.

Figure 17B:
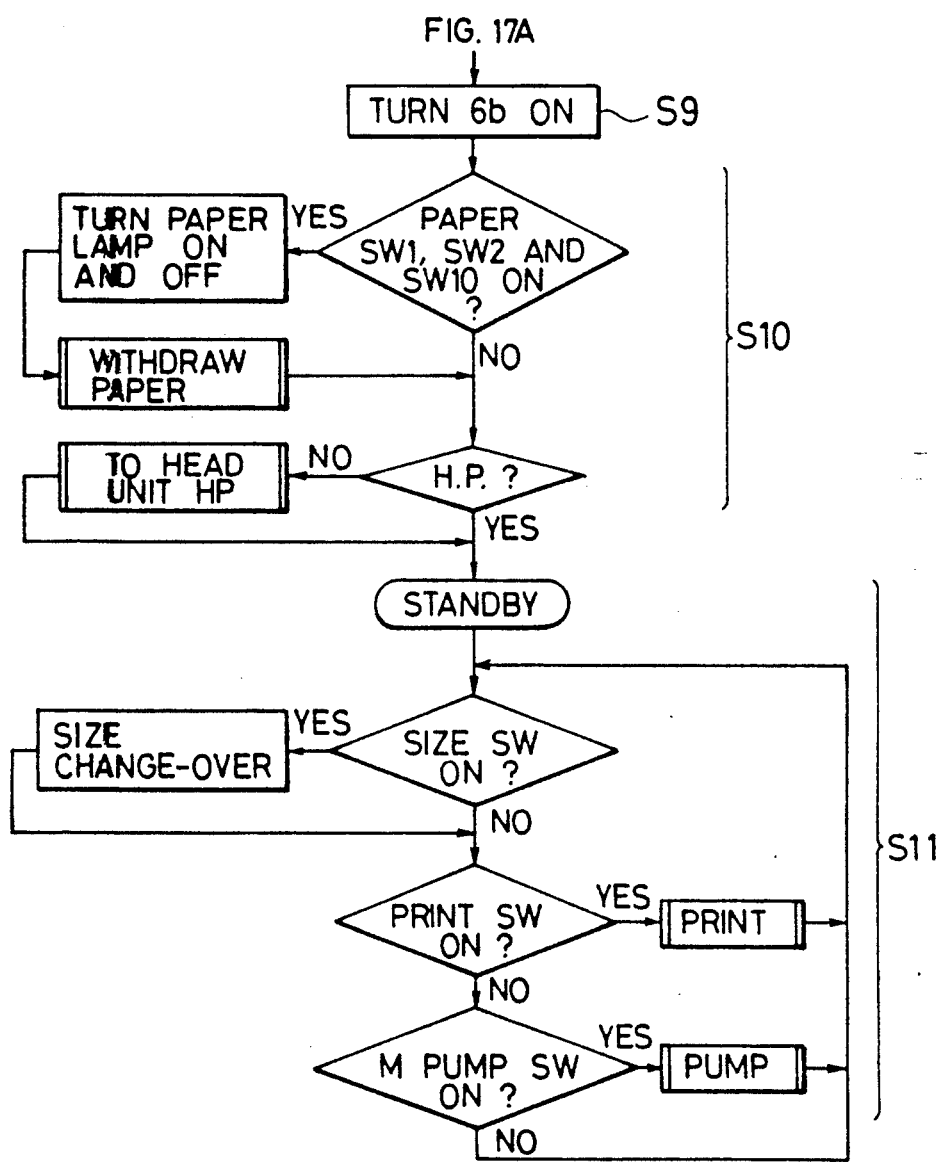

Start and Standby Routines (FIG. 17)

First, an initial standby routine shown in FIG. 17 will be described.

The CPU 911, under the state that a (unillustrated) main power source is turned on, detects if the power switch 6a is depressed by the user (step S1). Upon detection of the depression of the power switch 6a, the LED 6b is made to turn on and off (step S2) and the print size is automatically selected at the small size. In response to this, the LED 6h2 is turned on (step S3). Next, the mounting of the stacker 5 and paper cassette 17, the amount of residual paper, and the tight contact of the pinch roller 104 to the platen 101, are respectively sensed with the paper related sensor switches SW3, SW4, SW7 and SW8. If all of them are normal, the next step follows. However, if any one of them is abnormal, then the LED 6i is turned on and off and the internal register of the CPU 911 sets a flag indicative of the abnormal state of the paper related sensors to follow the next step (step S4). In a similar manner, the mounting of the ink cartridge 12 is detected with the sensor switch SW5. If the ink cartridge 12 is not mounted, then the LED 6j is turned on and off and a flag indicative of the abnormal state of the cartridge is set to follow the next step (step S5). At the next step S6, the temperature of ink is detected with the sensor 917. If the detected temperature is lower than the preset temperature, then the LED 6b is set to turn on and off. In this case, if the ink temperature is lower than the preset temperature at the time when the power switch 6a is turned on, the heater control circuit 918 is enabled (step S7). At the time when the ink temperature reaches the preset temperature, the abnormal flags are detected. If abnormal, the LED 6b as well as the LED 6i or 6l are maintained to turn on and off until the flag disappears (step S8). As the flag disappears and the ink temperature reaches the preset value, the LEDs 6i and 6j are turned off and the LED 6b is switched to illumination (step S9). Next, whether a recording paper remains in the recording feeder passage except the paper cassette 17 and stacker 5 or not is determined using the switches SW1, SW2, and SW10. If a recording paper remains, the paper withdrawal operation is performed by the paper withdrawal routine (FIG. 21) while the LED 6i is maintained to turn on and off. Alternatively, if a recording paper does not remain, the operation to make the head unit 211 restore to the home position (HP) on condition that the head unit 211 is not at the home position is performed (step S10). In principle, the recording paper should be only in the stacker 5 and the paper cassette 17, and the head unit 211 should have been at the home position. Therefore, the above restoration operation assumes the abnormal state at the most recent operation, for example, such state as the main power source was turned off, the plug receptacle was pulled out, a failure of power supply occurred, or so on. At the above steps S1 to S10, no input can be accepted except the interruption to turn off the power by depressing the power switch 6a.

In the standby state arranged as above, the input from the size change-over switch 6g, and in addition the inputs from the print switch 6c and pump actuation switch become acceptable (step S11). Upon depression of the print switch 6c, a print operation routine (FIG. 22) issues. During the print operation routine, the inputs from the pump switch and size change-over switch 6g are not accepted. Upon depression of the pump switch, the pump is actuated. During this period, the inputs from the print switch and size change-over switch 6g are rejected. After these operations, the standby routine resumes and goes into a standby state.

Print Routine (FIG. 22)

Figure 19:
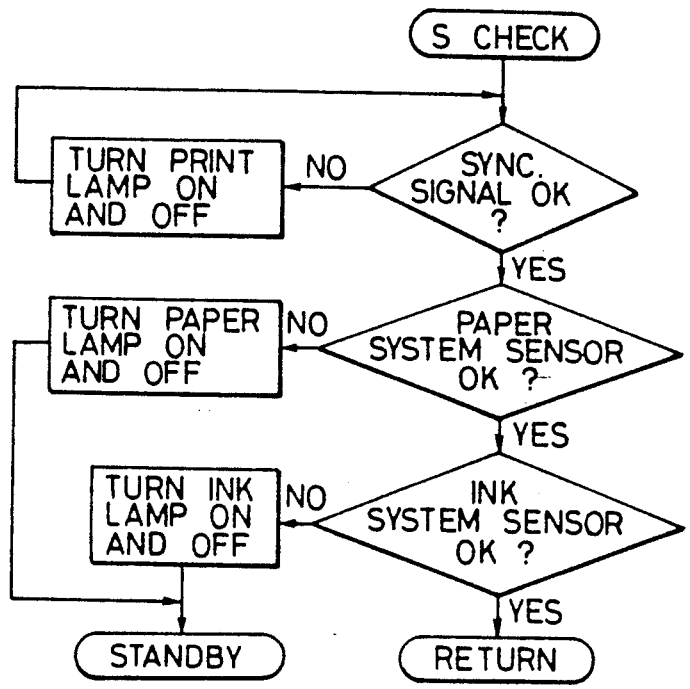

Next, the detailed description of a print operation will be given. During printing, the input from the stop switch 6e can be accepted. Upon depression of the print switch 6c, the LED 6d is made to illuminate. A recording paper is sensed with the switches SW1, SW2, and SW10. If any one of the switches detects the presence of a recording paper, the paper withdrawal routine (FIG. 21) issues to perform the paper withdrawal operation while the LED 6i is turned on and off (step S12). Thereafter, the ink temperature is checked, and if it is lower than the preset temperature, the LED 6b is changed to turn on and off until the ink temperature reaches the preset temperature (step S13). After the step S13, even if by any chance the ink temperature should fall below the preset temperature during printing, the whole sheet of the recording paper under printing is printed out. Next, a sensor check operation, that is, S check routine is performed which is shown in the flow of FIG. 19 (step S14). In this routine, first a synchronous signal included in a TV signal is checked. If there appears no synchronous signal, the LED 6d is turned on and off until a synchronous signal appears. Or an interruption is effected by the stop switch 6e to return to a standby state. If a normal synchronuous signal comes, the paper related switches SW3, SW4, SW7, SW8, and the cartridge sensor switch SW5 are checked. If an abnormal state is found, then the LED 6i and LED 6j are made to turn on and off, respectively to return to the standby state. If it is a normal state, then the next step S15 follows. At step S15, the motor M1 is rotated in the −D direction (opposite direction to the arrow D direction) by the amount corresponding to N1 pulses. The description of this operation will be made referring to FIGS. 8 and 9. The rotation of the motor M1 in the −D direction makes the gear 110, friction clutch 115, gear 116, and sector gear 118 to be driven into operation so that the paper feeder roller 120 is brought into contact with the uppermost recording paper within the paper cassette 17, and the paper is moved up to the position where paper feeding is controllable. At this time, the sector gear 118 stops at an (unillustrated) stopper and the succeeding rotation is absorbed in the friction clutch 115. Therefore, setting the rotation angle of the motor M1 at a larger one than that at need will suffice without necessitating a highly precise control. In association with the pivotal movement of the sector gear 118, the ejection or withdrawal roller 124 is also subjected to a pivotal movement since the curve portion 123a of the side wall 123 is pushed by the cutaway portion 118a of the sector gear 118. Thus, the ejection roller 124 is set at the position where paper ejection is controllable.

Next, at step S16, the motor M2 is driven into rotation in the drive direction of the one-way clutch 111, that is, in the arrow C direction. Consequently, the recording paper is delivered out by a friction force between the paper and the rubber roller portion 120a of the paper feeder roller 120. The uppermost one of the recording papers is separated by the separation nails 17e and 17e′ and is fed toward the paper guides 143 and 146. At the same time, a timer is actuated. During this period, although the ejection roller 124 is driven into rotation in the opposite direction to that during the withdrawal operation, no adverse effects are brought about since there exist no recording paper about the ejection roller 124.

Next, at step S17, before the timer counts a time period T1, it is checked whether the switch SW1 has detected the presence of the recording paper or not. For instance, if because of some trouble the recording paper is not pulled away from the separation nails 17e and 17e′, there occurs the case that the recording paper can not be delivered into position. Therefore, it is assumed that jamming has occurred. So, at step S18, the display LED 6j is turned on and off and the rotation of the motor M2 is interrupted. In addition, the motor M1 is driven in the arrow D direction by the amount corresponding to N1 pulses to thereby make the paper feeder roller 120 and withdrawal roller 124 retreat at the initial retreat positions. The retreat is effected so as to make it possible to dismount the cassette during the disposal of jamming and to make it easy to take away the jammed recording paper.

In the case that jamming does not exist, at step S19, the timer is again started to count a time period T2 and the motor M2 is stopped. The time period T2 is set to have a sufficient value for the recording paper to be accepted between the platen 101 and the resist roller 103 and also to make a necessary loop for paper track adjustment (resist). Since the timer starts to count upon detecting that the recording paper is present near the resist roller 103, the amount of loop becomes constant and the feeding amount of the recording paper in the following paper feeding operation is constant. Therefore, it is superior over the conventional method, such as feeding amount control with a semi-circular roller. After the rotation of the motor M2 is stopped, the motor M1 is driven in the paper feeding direction (D direction) by an amount corresponding to N2 pulses (N2>N1). Thus, the recording paper is frictionally fed with the contact pressure between the platen and the resist roller. Further, the recording paper is entangled about the platen 101 with the help of the paper presser spring 102, and the top end of the recording paper is bitten into the contact plane between the pinch roller 104 and the platen 101. In the succeeding stage, the contact pressure between the pinch roller 104 and the platen 101 becomes dominant to perform a frictional feeding. At the time when the switch SW2 detects the top end of the recording paper, pulses are terminated to be delivered to the pulse motor M1. Thus, the pulse motor M1 is held energized at a definite phase in order to retain the recording paper at the printing position.

In parallel with the above operation, upon rotation of the motor M1 in the D direction, the sector gear 118 and the side wall 123 are driven through the gear 110 and the friction clutch 115 in the opposite direction to the above. The sector gear 118 and side wall 123 abuts an (unillustrated) stopper portion, and after this the rotation is absorbed by the friction clutch 115. The paper feeder roller 120 and withdrawal roller 124 move to the retreat positions to withdraw from the recording paper guide portion so that the succeeding paper feeding is not influenced at all.

Thus, a precise frictional feeding is performed with the platen 101, paper presser spring 102, resist roller 103, pinch roller 104. Therefore, the evenness and feeding precision for the recording paper over the print area of the platen are assured. At step S20, if the recording paper does not reach the position of the switch SW2 after the motor M1 is driven by the amount corresponding to N2 pulses, jamming is assumed. Therefore, the display LED 6j is driven and the motor M1 is stopped to thereby return to the standby routine.

If the switch detects the recording paper, step S21 follows. That is, the apparatus is in an enabled state to record at the time when step S20 is finished. At step S21, the print size is input, and the waste feeding of a recording paper by the amount of x1 to x4 lines is carried out with the motor M1 in accordance with whether the TV signal is an NTSC, PAL, or SECAM. This waste feeding is for heading out a preset position of the recording paper along the sub-scanning direction (recording paper feeding direction). Likewise, N3, N4, and N7 are set in accordance with the print size and input signal. N3 indicates the number of dots along the main scanning direction, N4 indicates the number for use in getting the coincidence between the center of the scanning area of the head until 211 and the center of the recording paper, and N7 indicates the number for use in detecting the bottom end of the recording paper which will be described later. Next, at step S22, counters C2 and C3 for the sub-scanning direction are rest and data are transferred to the line memory 904. Then, the motor M3 is turned on to thereby make the carriage 212 to run in the I direction at a constant speed.

Figures 2, 22A:
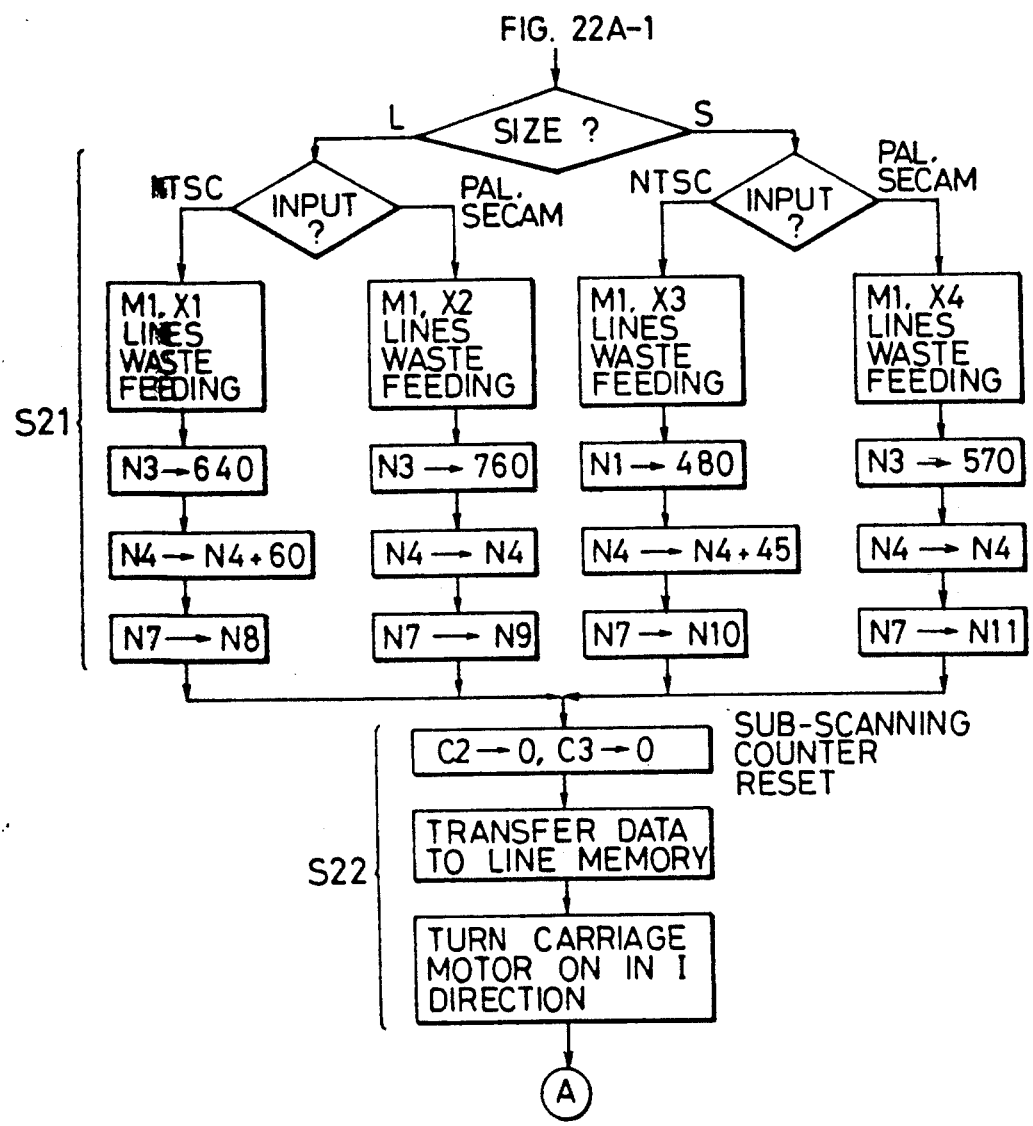
Figure 22B:
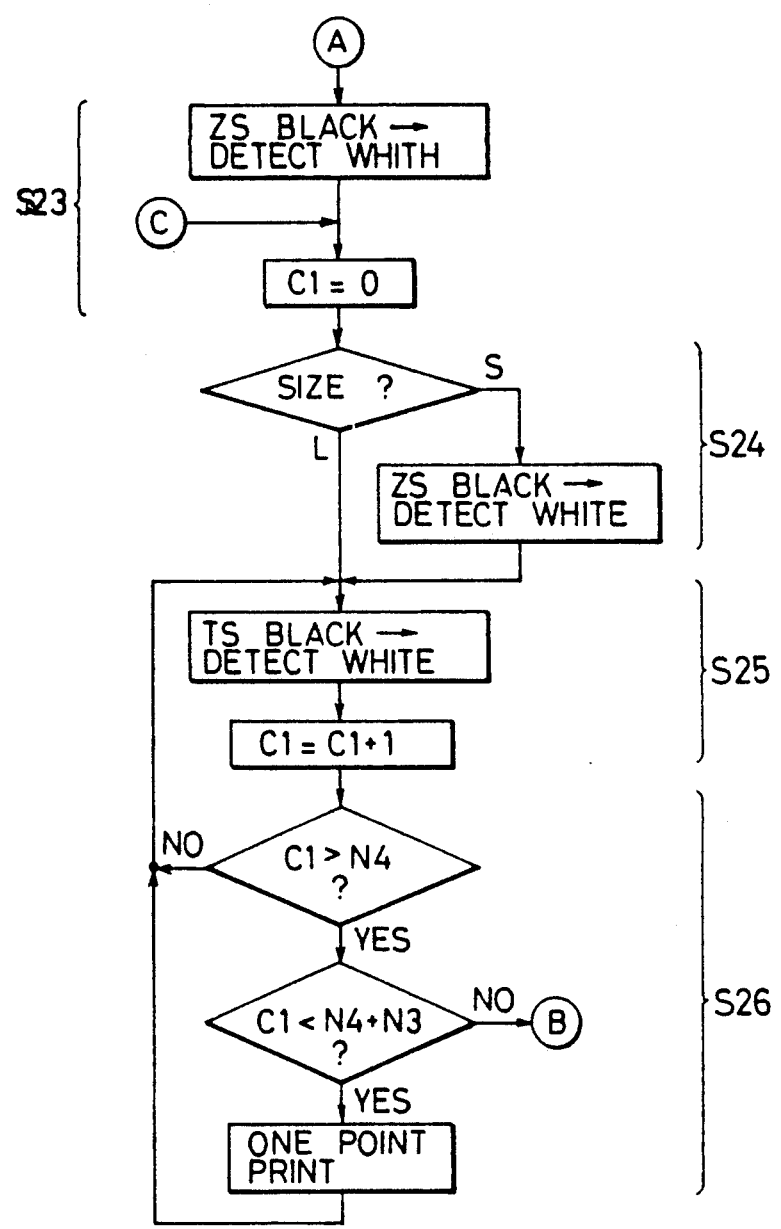
Figures 1, 22C:
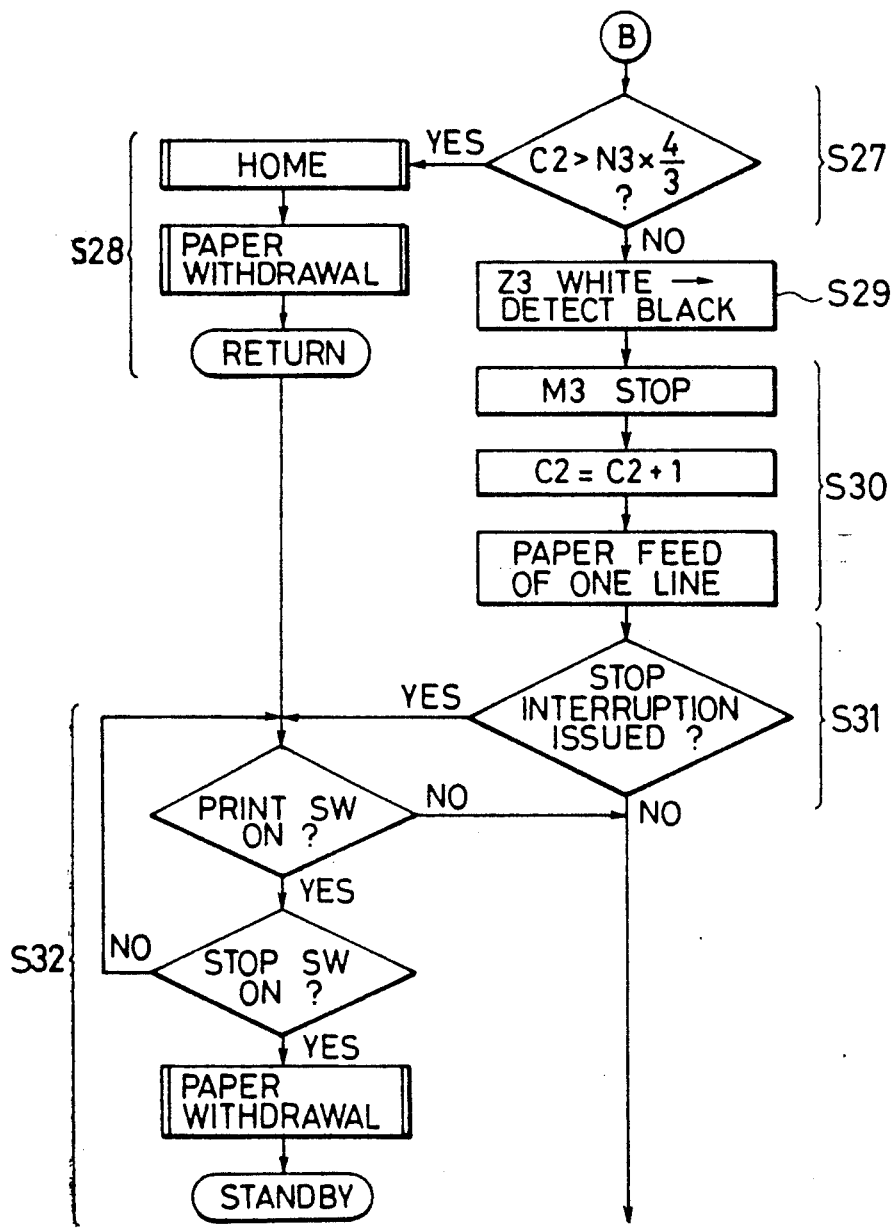
Figures 2, 22C:
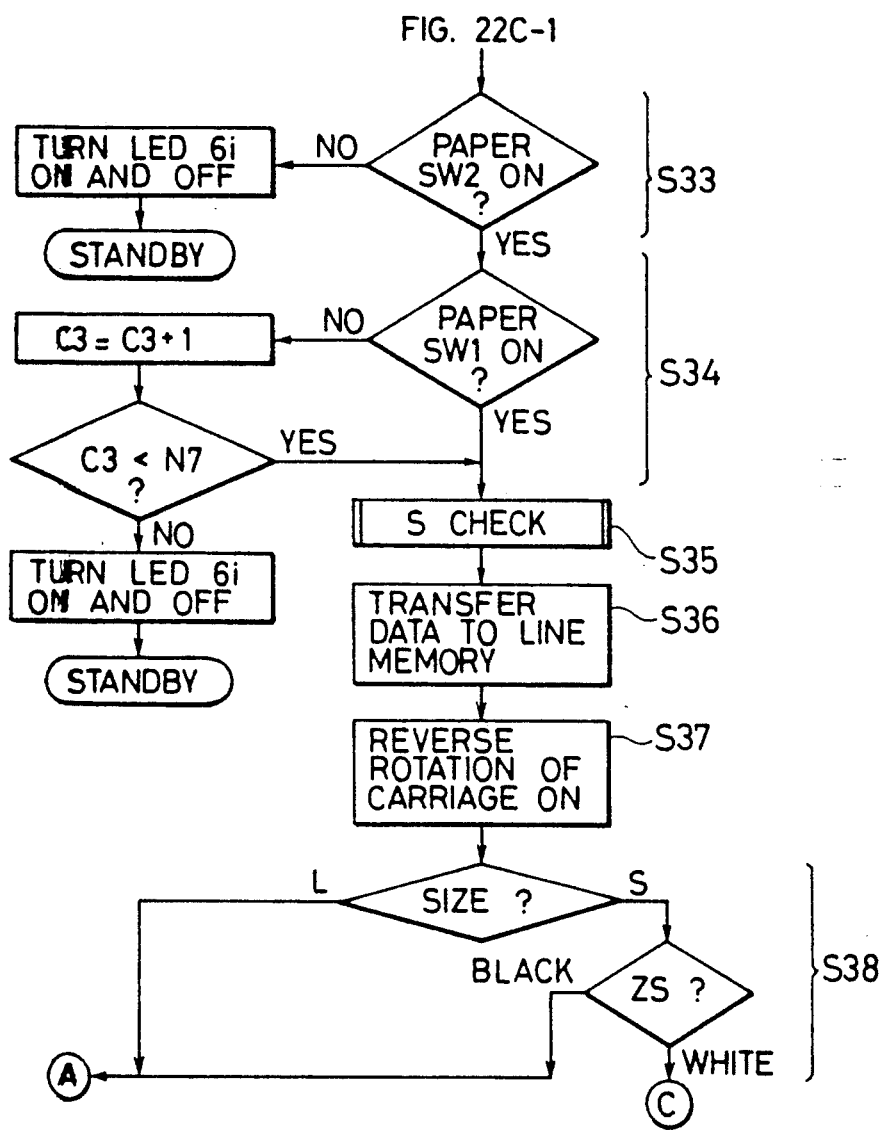

The above description was given with reference to FIG. 22A. Now, referring to FIG. 22B, at step S23, the counter C1 for the main scanning direction is reset, and the point where the zone slit 224c (ZS) of the fixed slit plate 224 changes from black to white, that is, the edge at the side of the home position of the zone slit 224c, is detected. Thereafter, at step S24 for the case of a small print size, the point where the next zone slit 224b changes from black to white, that is, the edge at the side of the home position of the zone slit 224b, is detected. Succeedingly, at step S25, at the time when the point where the timing slit 224a (TS) of the fixed slit plate 224 is detected, the main scanning counter C1 is counted up. At step S26, if the count value C1 of the counter C1 is smaller than N4, the detection of the point where TS changes from black to white is again carried out. With this loop, the position of the first print point is determined and printing one point after another continues until $C1 < N4 + N3$ is established, or in other words, until the points corresponding in number to the input and size are completely printed out. The print timing is set at the time when TS changes from black to white. In order to generate the print timing signal, controlling the opening/closing of a gate for the TS signal may be applied. After completion of a one line printing, the process advances to the point of FIG. 22C. At step S27, it is checked whether the points in the sub-scanning direction as many as 4/3 times as those in the main scanning direction have been printed out or not. If those points have been printed out, that means that a sheet of recording paper has completely printed out, then at step S28e, the carriage 212 is returned to the home position (HP) and the paper withdrawal operation is performed to resume a start state. Alternatively, if the whole lines in the sub-scanning direction are not still used for printing, at step S29 the white to black edges of the zone slits 224b and 224c are detected. For the small size, the edge of the zone slit 224b at the side opposite to the home position is detected, while on the other hand, for the large size, the edge of the zone slit 224c at the side opposite to the home position is detected. After such detection, at step S30, the terminal of the carriage motor M3 is short-circuited in order to stop the motor. Simultaneously therewith, the counter C2 for the sub-scanning direction is counted up and the motor M1 is driven into rotation to feed the recording paper by one line. At this time, at step S31 whether the stop switch 6e is depressed or not before the one line printing is terminated is judged. If there is a stop interruption and the print switch 6c is depressed, the next line printing is performed at step S32. And also, if the stop switch 6e is again depressed thereafter, the paper withdrawal operation is performed to resume a standby state. In the embodiment, the printing operation is arranged such that even if the stop switch 6e is depressed during the printing, the printing operation is not terminated instantly but a one line printing is always performed before such termination. If the stop switch 6e is not depressed during step S32, then at step S33 the switch SW2 is checked. If there is no recording paper, it means that jamming has occurred. Therefore, the LED 6i is turned on and off and a standby state resumes. If the check indicates the presence of the recording paper, the condition is normal. Therefore, at step S34 the switch SW1 is checked. In this case, if there is a recording paper, the next step follows. On the contrary, if there is no recording paper, the second counter C3 for the sub-scanning direction is counted up. The counter C3 is a counter for detecting the bottom edge of a recording paper. The object of the provision of the counter C3 is to issue a judgement as a jamming so as not to make the platen 101 become dirty by allowing ink drops to eject out onto the platen without a recording paper. More in particular, just before the end of a single sheet of recording paper, the switch SW1 does not detect the recording paper and the switch SW2 detects the recording paper. If such state continues for more than N7 lines, it arises a fear that ink drops might be jetted out onto the platen from which the recording paper has already passed away. This state may be brought about when a recording paper having a shorter length than the ordinary one is used or the paper feeding pitch longer than the ordinary one is employed. In such an abnormal state, similarly to the above, the LED 8i is turned on and off to resume a standby state. In the normal state of the switches SW1 and SW2, again at step S35 the S check routine (FIG. 19) is performed, and at step S36 data is transferred to the line memory 904. Next, at step S37 the carriage motor M3 is rotated in the opposite direction to the previous one. If the large print size is being used at step S38, the point of FIG. 22B is directly followed. The reason for this is that the stop position of the encoder sensor 226 fixedly mounted on the carriage 212 is without fail outside the zone slit 224c. In the case of the small size, if ZS is black, the encoder sensor 226 is located outside the zone slit 224c. Therefore, the point of FIG. 22B directly follows. If ZS is white at the stop position, since the encoder sensor 226 is located within the zone slit 224c, the point of FIG. 22B follows. In order to avoid a possible mal-function of the control, the black portion between the zone slits 224b and 224c is set sufficiently shorter as compared with the stop distance of the carriage 211. Starting from the point of FIG. 22B, sequential and repetitive operations are performed to print out a single sheet of recording paper. At step S27, if C2>N3×4/3 is detected by the subscanning direction counter, the carriage 211 is returned to the home position to resume the paper withdrawal operation.

Figure 21:
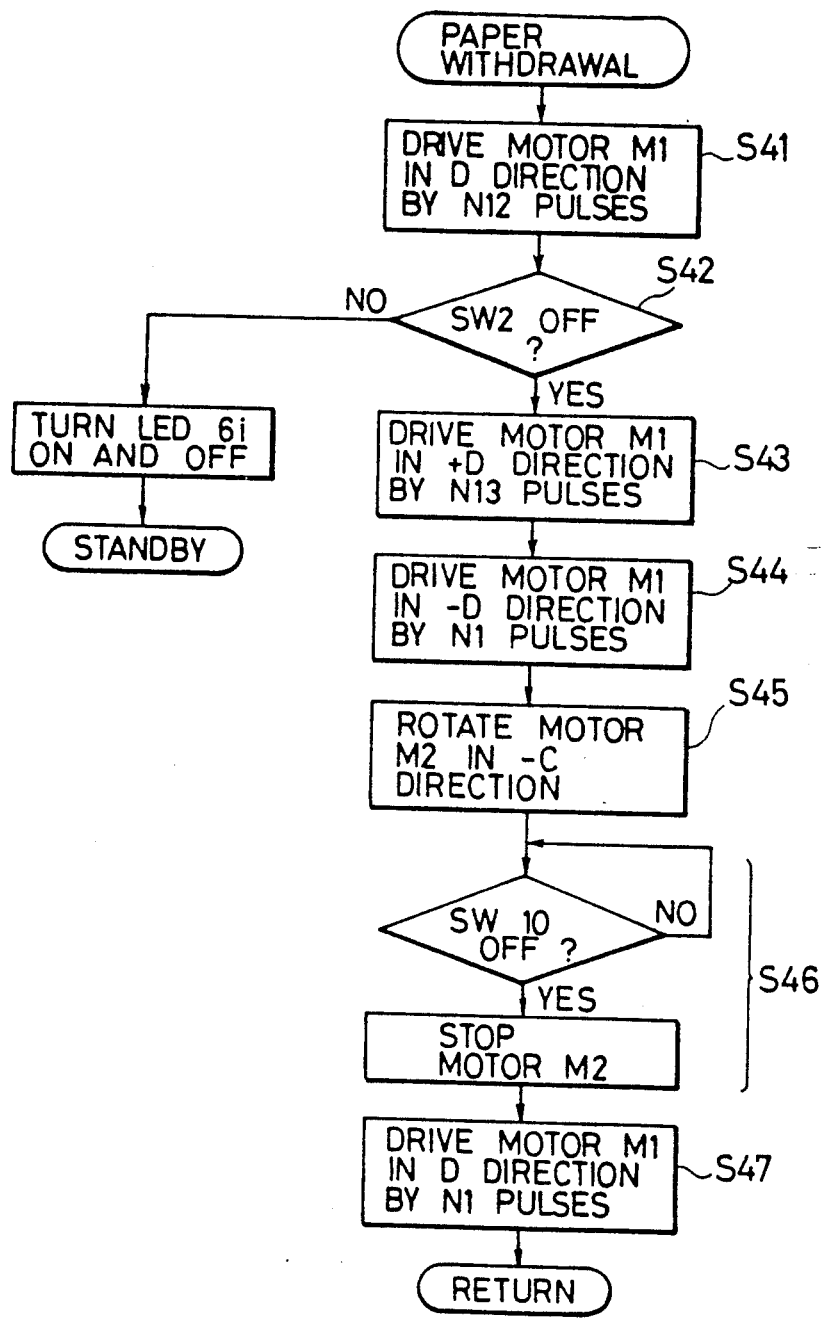

Paper withdrawal Routine (FIG. 21)

At step S41, the pulse motor M1 is driven in the arrow D direction by the amount corresponding to N12 pulses to feed and pull out the recording paper from the pinch roller 104. If the paper detection switch SW2 becomes OFF (paper is not present) at step S42, then at step S43 a further drive by the amount corresponding to N13 pulses is attained before the drive is terminated. If the switch SW12 does not become OFF even after the drive by the amount corresponding to N12 pulses, a jamming is assumed and in turn the LED 6j is turned on and off to thereafter stop the paper feeding operation. At step S44, the pulse motor M1 is driven in the opposite direction to the arrow D direction by the amount corresponding to an N1 pulse, thereby setting the paper feeder and withdrawal rollers 120 and 124 at the positions where the paper can be fed, instead of the retreat positions.

Next, at step S45 the motor M2 as shown in FIG. 8 is driven in the opposite direction to the arrow C direction. By doing so, the ejection or paper withdrawal roller 124 is rotated in the arrow B direction to eject out the recording paper. The rotation force of the roller 124 gives any adverse effects upon the recording paper in the paper cassette 17 since the force is of a resistive nature against the one way clutch 111 of the paper feeder roller 120. After the end of the paper withdrawal, at step S46 after the absence of the recording paper is detected with the paper detection switch SW10, the motor M2 is stopped.

Next, at step S47 the pulse motor M1 is driven in the arrow D direction by the amount corresponding to an N1 pulse so as to retreat the paper feeder roller 120 and the withdrawal roller 124 from their positions: By doing so, the paper cassette 17 can be smoothly pulled out without scratching it against the paper feeder roller 120.

Figure 18:
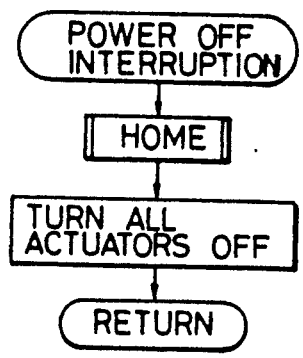

Power-off Interruption Routine (FIG. 18)

The turning-off by the power switch 6a is always observed through interruption. Upon turning off, a homing routine (FIG. 20) is performed. After all of the actuators are rendered to be turned off, a start routine resumes.

Figure 20:
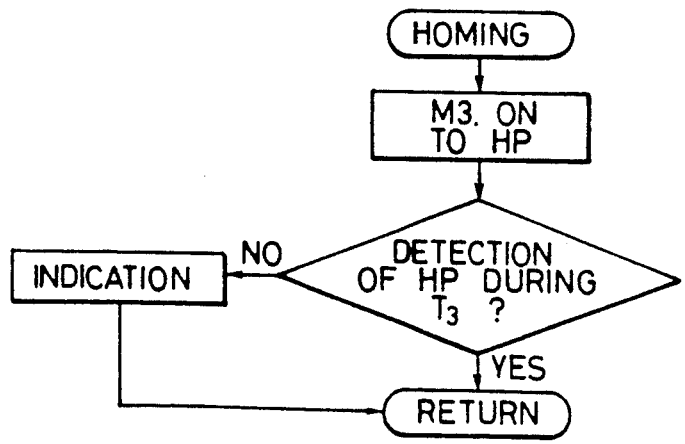

Homing Routine (FIG. 20)

By driving the motor M3 for a time period T3, the carriage 212 is returned to the home position (HP). In the case that the home position is not detected with the switch SW9 within the time period T3, an abnormal indication is displayed to thereafter return to the start routine (FIG. 17). If the home position is detected, the start routine is directly followed.

What is claimed is:

1. A recording apparatus, comprising:
   recording means for recording at a predetermined recording position on a recording sheet;
   a feed roller for feeding a recording sheet past the recording position in association with the recording action of said recording means;
   resist means for contacting a recording sheet to determine the position of the recording sheet relative to the recording position;
   sheet supplying means movable between contact and retreat positions for selective contact with a recording sheet for supplying the recording sheet to between said feed roller and resist means, wherein said sheet supplying means moves from its contact position to its retreat position to prevent contact thereof with a recording sheet simultaneously with the feeding of the recording sheet by said feed roller;
   a drive source for driving said feed roller; and
   operating means for moving said sheet supplying means from the contact position to the retreat position independently of the supplying operation of said sheet supplying means, using the drive power of said drive source as applied to said feed roller.

2. A recording apparatus according to claim 1, wherein said operating means is so arranged as to move said sheet supplying means from the contact position to the retreat position in association with driving of said drive source to rotate said feed roller in a predetermined direction.

3. A recording apparatus according to claim 2, wherein said operating means is so arranged so as to move said sheet supplying means from the retreat position to the contact position in association with driving of said drive means to rotate said feed roller in the direction opposite to said predetermined direction.

4. A recording apparatus according to claim 1, further comprising a secondary drive source for driving said sheet supplying means at the contact position so as to supply the recording sheet.

5. A recording apparatus according to claim 1, further comprising a mounting section for mounting sheet accommodating means; wherein said sheet supplying means is so arranged as to supply the recording sheet accommodated within said sheet accommodating means toward the recording position of said recording means.

6. A recording apparatus according to claim 5, wherein said sheet supplying means is rotatable about one axial line, and said mounting section is constructed such that said sheet accommodating means is mounted substantially parallel to the axial line.

7. A recording apparatus comprising:
   recording means for recording on a recording sheet;
   a feed roller for feeding a recording sheet past a recording position of said recording means in association with the recording action of said recording means;

sheet withdrawal means movable between contact and retreat positions for selective contact with a recording sheet for withdrawing the recording sheet from the recording position, wherein said sheet withdrawal means moves from its contact position to its retreat position to prevent contact thereof with a recording sheet simultaneously with the feeding of the recording sheet at the recording position by said feed roller;

a drive source for driving said feed roller; and operating means for moving said sheet withdrawal means from the contact position to the retreat position using the drive power of said drive source as applied to said feed roller.

8. A recording apparatus according to claim 7, wherein said operating means is so arranged as to move said sheet withdrawal means from the contact position to the retreat position in association with driving of said drive source to rotate said feed roller in a predetermined direction.

9. A recording apparatus according to claim 8, wherein said operating means is so arranged as to move said sheet withdrawal means from the retreat position to the contact position in association with driving of said drive source to rotate said feed roller in the direction opposite to said predetermined direction.

10. A recording apparatus according to claim 7, further comprising a secondary drive source for driving said sheet withdrawal means at the contact position so as to feed the recording sheet with said sheet withdrawal means.

11. A recording apparatus according to claim 7, wherein the recording sheet has a predetermined length in the feeding direction, the distance between the recording position of said recording means and the contact position of said sheet withdrawal means being shorter than the feeder length of the recording sheet.

12. A recording apparatus, comprising:

recording means for recording at a predetermined recording position on a recording sheet;

a feed roller for feeding a recording sheet past the recording position in association with the recording action of said recording means;

resist means contacting a recording sheet to determine the position of the recording sheet relative to the recording position;

sheet supplying means movable between contact and retreat positions for selective contact with a recording sheet for supplying the recording sheet to between said feed roller and resist means, wherein said sheet supplying means moves from its contact position to its retreat position to prevent contact thereof with a recording sheet simultaneously with the feeding of the recording sheet at the recording position by said feed roller;

sheet withdrawal means movable between contact and retreat positions for selective contact with a recording sheet for withdrawing the recording sheet from the recording position, wherein said sheet withdrawal means moves from its contact position to its retreat position to prevent contact thereof with a recording sheet simultaneously with the feeding of the recording sheet at the recording position by said feed roller;

a drive source for driving said feed roller; and operating means for moving said sheet supplying means and sheet withdrawal means from their contact positions to their retreat positions independently of the supplying operation of said sheet supplying means and the withdrawing operation of said sheet withdrawal means, using the drive power of said drive source as applied to said feed roller.

13. A recording apparatus according to claim 12, wherein said operating means is so arranged as to move said sheet supplying and withdrawal means from contact positions to the retreat positions in association with driving of said drive source to rotate said feed roller in a predetermined direction.

14. A recording apparatus according to claim 13, wherein said operating means is so arranged as to move said sheet supplying and withdrawal means from retreat positions to contact positions in association with driving of said drive source to rotate said feed roller in the direction opposite to said predetermined direction.

15. A recording apparatus according to claim 12, further comprising a secondary drive source for driving said sheet supplying and withdrawal means at their contact positions so as to supply and withdraw the recording sheet.

16. A recording apparatus according to claim 12, further comprising a mounting section for mounting sheet accommodating means; wherein said sheet supplying means is so arranged as to supply the recording sheet accomodated therein, said sheet accommodating means being mounted toward the recording position of said recording means.

17. A recording apparatus according to claim 16, wherein said sheet supplying means is rotatable about one axial line, and said mounting section is constructed such that said cassette is mounted substantially parallel to the axial line.

18. A recording apparatus according to claim 12, wherein the recording sheet has a predetermined length in the feeding direction, the distance between the recording position of said recording means and the contact position of said sheet withdrawal means being shorter than the feeder length of the recording sheet.

19. A recording apparatus comprising:

recording means for recording at a predetermined recording position on a recording sheet having a predetermined length in a feeding direction;

a feed roller for feeding a recording sheet past the recording position in association with the recording action of said recording means;

resist means for contacting a recording sheet to determine the position of the recording sheet relative to the recording position;

sheet supplying means movable between contact and retreat positions for selective contact with a recording sheet for supplying the recording sheet to between said feed roller and resist means, wherein said sheet supplying means moves from its contact position to its retreat position to prevent contact thereof with a recording sheet simultaneously with the feeding of the recording sheet at the recording position by said feed roller;

sheet withdrawal means movable between contact and retreat positions for selective contact with a recording sheet for withdrawing the recording sheet from the recording position, wherein said sheet withdrawal means moves from its contact position to its retreat position to prevent contact thereof with a recording sheet simultaneously with the feeding of a recording sheet at the recording position by said feed roller;

a withdrawal passage along which a recording sheet is withdrawn from the recording position to the contact position of said withdrawal means, said withdrawal passage being shorter than the predetermined length; and operating means for moving said sheet supplying means and sheet withdrawal means from their contact positions to their retreat positions during recording by said recording means.

20. A recording apparatus comprising:

recording means for recording at a predetermined recording position on a recording sheet;

a feed roller for feeding in a feeding direction the recording sheet past the predetermined recording position in association with recording by said recording means;

first and second press rollers for pressing the recording sheet against said feed roller at first and second circumferentially spaced positions in the feeding direction of said feed roller, wherein said recording means is operable only when the recording sheet is pressed against said feed roller surface by said first and second press rollers extending between the first and second circumferentially spaced positions, said recording means being positioned to record on the recording sheet at an intermediate location between the first and second circumferentially spaced positions;

sheet withdrawal means movable between contact and retreat positions for selective contact with a recording sheet for withdrawing the recording sheet from the predetermined recording position, wherein said sheet withdrawal means moves from its contact position to its retreat position to prevent contact thereof with a recording sheet simultaneously with the feeding of the recording sheet at the recording position by said feed roller;

a drive source for driving said feed roller; and operating means for moving said sheet withdrawal means from the contact position to the retreat position using the drive power of said drive source as applied to said feed roller.

21. A recording apparatus according to claim 1, further comprising a sensor for detecting the presence of the recording sheet between said sheet supplying means and resist means, wherein said drive source is controlled by an output of said sensor.

22. A recording apparatus according to claim 7, further comprising a sensor for detecting the presence of the recording sheet between said feed roller and sheet withdrawal means, wherein said drive source is controlled by an output of said sensor.

23. A recording apparatus according to claim 12, further comprising a sensor for detecting the presence of the recording sheet between said sheet supplying means and resist means, wherein said drive source is controlled by an output of said sensor.

24. A recording apparatus according to claim 19, further comprising a sensor for detecting the presence of the recording sheet between said feed roller and sheet withdrawal means, wherein said feed source is controlled by an output of said sensor.

25. A recording apparatus comprising:

recording means for recording at a predetermined recording position on a recording sheet;

a feed roller for feeding in a feeding direction the recording sheet past the predetermined recording position in association with the recording by said recording means;

first and second press rollers for pressing the recording sheet against said feed roller at first and second circumferentially spaced press positions in the feeding direction of said feed roller, wherein the predetermined recording position is between said first and second press rollers;

first and second detecting means for detecting the presence or absence of the recording sheet proximate to the respective press positions at which said first and second press rollers press the recording sheet against said feed roller; and control means for prohibiting recording by said recording means when at least one of said first and second detecting means detects the absence of the recording sheet.

26. A recording apparatus according to claim 25, wherein the recording sheet has a predetermined length and the distance between said first and second press rollers is smaller than the length of the recording sheet in the feeding direction thereof.

27. A recording apparatus according to claim 25, wherein one of said first and second detecting means includes a reflecting type photosensor.

28. A recording apparatus according to claim 25, wherein said first press roller has a first press strength against said feed roller and said second press roller has a second press strength against said feed roller, the first circumferentially spaced position is behind the second circumferentially spaced position in relation to said feed roller in the feeding direction, and the first press strength is larger than the second press strength.

29. A recording apparatus comprising:

recording means for recording at a predetermined recording position on a recording sheet;

a feed roller for feeding in a feeding direction the recording sheet past the predetermined recording position in association with recording by said recording means; and first and second press rollers respectively disposed on one side and the other side of said recording means in the feeding direction for pressing the recording sheet against said feed roller on both of said sides of recording means, wherein said recording means is operable only when both of said first and second press rollers simultaneously press the recording sheet against said feed roller.

30. A recording apparatus according to claim 29, wherein the recording sheet is paper.

31. A recording apparatus according to claim 29, wherein said first press roller has a first press strength against said feed roller and said second press roller has a second press strength against said feed roller, the first press strength being different from the second press strength.

32. A recording apparatus according to claim 31, wherein the first circumferentially spaced position is behind the second circumferentially spaced position in relation to said feed roller in the feeding direction.

33. A recording apparatus according to claim 32, wherein the first press strength is larger than the second press strength.

34. A recording apparatus according to claim 29, wherein said recording means is vertical to the feeding direction.

35. A recording apparatus comprising:

first and second loading means for loading a recording medium;

transportation means for transporting the recording medium from said first loading means to said second loading means through a predetermined route;

stabilizing means arranged in the predetermined route for stabilizing a surface of the recording medium in a particular portion of the predetermined route;

recording means disposed oppositely to the particular portion for recording on the recording medium located in said particular portion; and control means for rendering said recording means inoperative when the recording medium is not simultaneously located in both the upper end and the lower end in the feeding direction of said predetermined position.

36. A recording apparatus, comprising:

recording means for recording at a predetermined recording position on a recording sheet;

a feed roller for feeding in a feeding direction the recording sheet past the predetermined recording position in association with recording by said recording means;

first and second press rollers for pressing the recording sheet against said feed roller at first and second circumferentially spaced press positions in the feeding direction of said feed roller, wherein the predetermined recording position is between said first and second press rollers;

sheet supplying means movable between contact and retreat positions for selective contact with a recording sheet for supplying the recording sheet to between said feed roller and said first and second press rollers, wherein said sheet supplying means moves from its contact position to its retreat position to prevent contact thereof with a recording sheet simultaneously with the feeding of the recording sheet by said feed roller;

first and second detecting means for detecting the presence or absence of the recording sheet proximate to the respective press positions at which said first and second press rollers press the recording sheet against said feed roller;

control means for prohibiting recording by said recording means when at least one of said first and second detecting means detects the absence of the recording sheet;

a drive source for driving said feed roller; and operating means for moving said sheet supplying means from the contact position to the retreat position independently of the supplying operation of said sheet supplying means, using the drive power of said drive source as applied to said feed roller.

* * * * *

UNITED STATES PATENT AND TRADEMARK OFFICE
CERTIFICATE OF CORRECTION

PATENT NO. : 5,019,840
DATED : May 28, 1991
INVENTOR(S) : YOSHITAKA WATANABE, ET AL.

It is certified that error appears in the above-identified patent and that said Letters Patent is hereby corrected as shown below:

IN THE DRAWINGS:
    Sheet 14 of 22, FIG. 17A, in box S7 "HEATOR" should read --HEATER--.

COLUMN 1:
    Line 22, "are" should read --was--.

COLUMN 3:
    Line 65, "inkjetting" should read --ink-jetting.--

COLUMN 4:
    Line 11, "22a-z," should read --22a-2,--;
    Line 12, "22c-z" should read --22c-2--;
    Line 41, "such as" should be deleted.

COLUMN 6:
    Line 35, "in 26" should read --pin 26--;
    Line 36, "to" should read --to be--;
    Line 39, "rearward" should read --rearward so--; and
    Line 65, "327" should read --32'--.

COLUMN 7:
    Line 34, "plate 5s" should read --plate 5a--.

COLUMN 9:
    Line 37, "those" should read --the--;
    Line 41, "junctions" should read --junction--; and
    Line 45, before "described" insert --will be-- and "as will be the" should read --as the--.

COLUMN 10:
    Line 22, "portions 102" should read --portions 102b--;
    Line 34, "107' and 108." should read --107' and 108'.--;
    Line 35, "pinch" should read --resist--; and

UNITED STATES PATENT AND TRADEMARK OFFICE
CERTIFICATE OF CORRECTION

PATENT NO. : 5,019,840

DATED : May 28, 1991

INVENTOR(S) : YOSHITAKA WATANABE, ET AL.

It is certified that error appears in the above-identified patent and that said Letters Patent is hereby corrected as shown below:

COLUMN 10 (Continued)
    Line 49, "102 and 102'" should read --102b and 102b'--.

COLUMN 11:
    Line 14, "paper 101" should read --paper P--; and
    Line 53, "f1 > f2 (2)" should read --f1 < f2 (2)--

COLUMN 12:
    Line 33, "not shown" should read --unillustrated--;
    Line 46, "uni" should read --uni- --;
    Line 48, "a not shown" should read --an unillustrated--; and
    Line 52, "uni direc-" should read --unidirec- --.

COLUMN 13:
    Line 15, "a not shown" should read --an unillustrated--;
    Line 46, "problem" should read --problems--;
    Line 51, "roller 125" should read --roller 124--; and
    Line 53, "rotates" should read --rotate-- and
    "uni directional" should read --unidirectional--.

COLUMN 14:
    Line 40, "is" should be deleted; and
    Line 54, "pin 1432b" should read --pin 142b--.

COLUMN 15:
    Line 24, "304" should read --305--;
    Line 39, "not" should read --unillustrated--;
    Line 40, "shown" should be deleted;
    Line 51, "how" should read --of how--;
    Line 67, "a" should read --any--; and
    Line 68, "nail" should be deleted.

UNITED STATES PATENT AND TRADEMARK OFFICE
CERTIFICATE OF CORRECTION

PATENT NO. : 5,019,840

DATED : May 28, 1991

INVENTOR(S) : YOSHITAKA WATANABE, ET AL.

It is certified that error appears in the above-identified patent and that said Letters Patent is hereby corrected as shown below:

COLUMN 16:
   Line 20, "capilary" should read --capillary--; and
   Line 66, "Numeral 211" should read --Numeral 213--.

COLUMN 17:
   Line 39, "(illustrated)" should read --unillustrated--.

COLUMN 18:
   Line 45, "detects" should read --detect--; and
   Line 58, "element 230" should read --element 230a--.

COLUMN 19:
   Line 26, "slit 224b" should read --slits 224b--;
   Line 29, "slit 224b," should read --slits 224b,--; and
   Line 62, "heater 218," should read --heater 213,--.

COLUMN 20:
   Line 1, "61s." should read --61.--; and
   Line 17, "that" should be deleted.

COLUMN 23:
   Line 46, "until" should read --unit--; and
   Line 50, "rest" should read --reset--.

COLUMN 24:
   Line 11, "point" should read --point Ⓑ --; and
   Line 17, "S28e," should read --S28,--.

COLUMN 25:
   Line 8, "point" should read --point Ⓐ --;
   Line 13, "point" should read --point Ⓐ --;
   Line 16, "point" should read --point Ⓒ --;
   Line 17, "mal-function" should read --malfunction--; and
   Line 20, "point" should read --point Ⓐ --.

UNITED STATES PATENT AND TRADEMARK OFFICE
CERTIFICATE OF CORRECTION

PATENT NO. : 5,019,840

DATED : May 28, 1991

INVENTOR(S) : YOSHITAKA WATANABE, ET AL.

It is certified that error appears in the above-identified patent and that said Letters Patent is hereby corrected as shown below:

COLUMN 28:
    Line 30, "accomodated" should read --accommodated--.

COLUMN 29:
    Line 64, "feed source" should read --feed roller--.

Signed and Sealed this

Twelfth Day of July, 1994

Attest:

BRUCE LEHMAN

Attesting Officer      Commissioner of Patents and Trademarks